United States Patent
Wang et al.

(10) Patent No.: US 11,435,493 B2
(45) Date of Patent: Sep. 6, 2022

(54) ENHANCED WAVEFORM ANALYSIS FOR TARGET MODES OF BOREHOLE WAVES

(71) Applicant: HALLIBURTON ENERGY SERVICES, INC., Houston, TX (US)

(72) Inventors: Ruijia Wang, Singapore (SG); Chung Chang, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1113 days.

(21) Appl. No.: 16/064,997

(22) PCT Filed: Jun. 15, 2017

(86) PCT No.: PCT/US2017/037614
§ 371 (c)(1),
(2) Date: Jun. 21, 2018

(87) PCT Pub. No.: WO2018/231234
PCT Pub. Date: Dec. 20, 2018

(65) Prior Publication Data
US 2021/0208299 A1     Jul. 8, 2021

(51) Int. Cl.
| | |
|---|---|
| G01V 1/50 | (2006.01) |
| G01V 1/16 | (2006.01) |
| G01V 1/36 | (2006.01) |

(52) U.S. Cl.
CPC ............... *G01V 1/50* (2013.01); *G01V 1/162* (2013.01); *G01V 1/364* (2013.01);
(Continued)

(58) Field of Classification Search
CPC .......... G01V 1/50; G01V 1/162; G01V 1/364; G01V 2210/42; G01V 2210/47; G01V 2210/582
See application file for complete search history.

(56) References Cited

U.S. PATENT DOCUMENTS

| | | |
|---|---|---|
| 5,237,538 A | 8/1993 | Linville, Jr. et al. |
| 5,587,966 A | 12/1996 | Kimball et al. |
| | (Continued) | |

FOREIGN PATENT DOCUMENTS

| | | |
|---|---|---|
| WO | 2010040087 A2 | 4/2010 |
| WO | 2014070182 A1 | 5/2014 |
| WO | 2015021004 A1 | 2/2015 |

OTHER PUBLICATIONS

International Search Report and Written Opinion; PCT Application No. PCT/US2017/037614; dated Mar. 12, 2018.

*Primary Examiner* — Toan M Le
*Assistant Examiner* — Xiuqin Sun
(74) *Attorney, Agent, or Firm* — Polsinelli PC

(57) ABSTRACT

A method for enhanced dispersion analysis begins with obtaining a plurality of measured waveforms, for example from two or more receivers of an acoustic logging tool placed in a borehole. The measured waveforms are divided into common gathers, and waveforms of each common gather are enhanced. The enhancement begins by calculating a travel time curve for a selected target mode of the common gather waveforms. Using the travel time curve, waveforms of the selected target mode are aligned to have zero apparent slowness. The aligned waveforms are filtered to suppress non-target mode waves. The aligned waveforms are then enhanced, and used to generate an enhanced dispersion curve of the selected target mode.

18 Claims, 15 Drawing Sheets

(52) U.S. Cl.
CPC ...... *G01V 2210/42* (2013.01); *G01V 2210/47* (2013.01); *G01V 2210/582* (2013.01)

(56) References Cited

U.S. PATENT DOCUMENTS

| | | | |
|---|---|---|---|
| 5,933,789 | A | 8/1999 | Byun et al. |
| 6,449,560 | B1 | 9/2002 | Kimball |
| 8,121,791 | B2 | 2/2012 | Lazaratos et al. |
| 8,456,952 | B2 | 6/2013 | Tang et al. |
| 9,354,342 | B2 * | 5/2016 | Mandal .................... G01V 1/48 |
| 9,702,999 | B2 * | 7/2017 | Sun ........................ G01V 1/303 |
| 2003/0058739 | A1 | 3/2003 | Hsu et al. |
| 2004/0122596 | A1 | 6/2004 | Sudhaker et al. |
| 2005/0254343 | A1 | 11/2005 | Saiki et al. |
| 2006/0287830 | A1 | 12/2006 | Tang |
| 2009/0259404 | A1 * | 10/2009 | Hirabayashi ............. G01V 1/48 |
| | | | 702/9 |
| 2009/0276159 | A1 | 11/2009 | Strobbia |
| 2010/0286921 | A1 | 11/2010 | Lee et al. |
| 2011/0085420 | A1 | 4/2011 | Bussat et al. |
| 2014/0019058 | A1 | 1/2014 | Donderici |
| 2015/0049585 | A1 | 2/2015 | Collins et al. |
| 2016/0209538 | A1 * | 7/2016 | Wang ........................ G01V 1/48 |
| 2018/0038980 | A1 * | 2/2018 | Goodyear ................ G01V 1/50 |

* cited by examiner

ENHANCED WAVEFORM ANALYSIS FOR TARGET MODES OF BOREHOLE WAVES

CROSS-REFERENCE TO RELATED APPLICATIONS

This application is a national stage entry of PCT/US2017/037614 filed Jun. 15, 2017, said application is expressly incorporated herein in its entirety.

TECHNICAL FIELD

The present technology pertains to acoustic logging of borehole waves in a subterranean borehole, and more specifically to improved dispersion analysis for target modes of borehole waves.

BACKGROUND

Borehole acoustic logging tools are employed for a variety of purposes related to formation measurement and characterization. In general, acoustic logging tools measure different dispersive borehole wave modes propagating along the longitudinal borehole axis, and analyze the dispersions of target modes in order to determine various geophysical and mechanical properties of the formation through which the particular borehole passes. More particularly, dispersions characterize the relationship between wave slowness and wave number/frequency, and can be used to provide insight into various material and geometric properties of the borehole and surrounding formation, such as 3D profiles of rock formation shear slowness and stress distributions around the borehole. In some cases, a particular type of dispersion may be of interest—for example, the aforementioned profiling of rock formation shear wave slowness is based on an analysis of flexural dispersions and screw wave dispersions.

While it is known that target mode dispersion curves can carry large amounts of information relating to formation characteristics, it is often very difficult to first obtain an accurate dispersion curve from raw borehole waveform data. Numerous factors can cause significant noise and interference that contaminates the target modes. These factors include, for example, wave scattering due to the borehole radius changing, strong formation anisotropy, and non-suppressed tool waves. In some borehole environments, such as deep water reservoirs and shallow reservoirs, acoustic signals can be very weak, while other environments might present strong formation anisotropy. In general, strong formation heterogeneity invalidates conventional multi-mode dispersion extraction and analysis methods, as these methods all assume a homogeneous formation wherein formation slowness does not change along the borehole axis.

Even further still, regardless of borehole environment, the excitation amplitude of the target modes at some key frequencies is close to zero, largely due to the physics of borehole wave propagation (e.g. target modes at the low-frequency asymptotes of flexural waves), meaning that the dispersion data at these key frequencies is fundamentally associated with a low signal-to-noise ratio (SNR). However, this dispersion data provides reliable speed information of the surrounding formation, and cannot simply be ignored.

As such, it can be a challenging task, even with an ideal acoustic tool consisting of broad band receivers and transmitters, to extract a complete, accurate, and reliable dispersion curve from raw waveform data. Consequently, it is highly desirable to find an advanced method for enhancing raw waveform data to suppress the influence of scattering waves, tool waves, and other non-target wave modes, and to generate a more accurate characterization of the entire dispersion curve, including those portions with low SNR.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
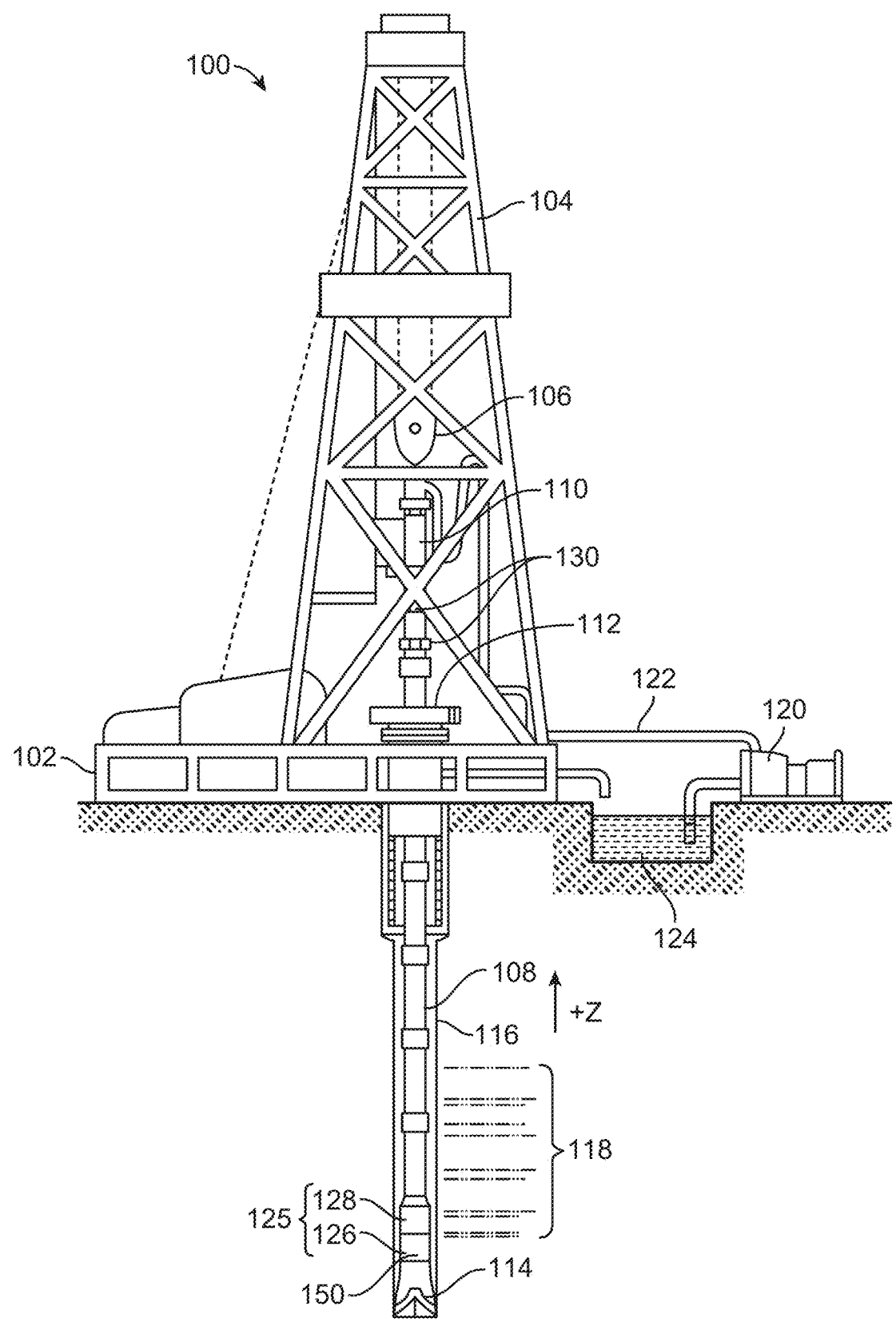
FIG. 1 illustrates a diagrammatic view of a logging while drilling and/or measurement while drilling wellbore operating environment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

It should be understood at the outset that although illustrative implementations of one or more embodiments are illustrated below, the disclosed apparatus and methods may be implemented using any number of techniques. The disclosure should in no way be limited to the illustrative implementations, drawings, and techniques illustrated herein, but may be modified within the scope of the appended claims along with their full scope of equivalents.

Unless otherwise specified, any use of any form of the terms "connect," "engage," "couple," "attach," or any other term describing an interaction between elements is not meant to limit the interaction to direct interaction between the elements and also may include indirect interaction between the elements described. In the following discussion and in the claims, the terms "including" and "comprising" are used in an open-ended fashion, and thus should be interpreted to mean "including, but not limited to . . . ". Reference to up or down will be made for purposes of description with "up," "upper," "upward," "upstream," or "uphole" meaning toward the surface of the wellbore and with "down," "lower," "downward," "downstream," or "downhole" meaning toward the terminal end of the well, regardless of the wellbore orientation. The various characteristics described in more detail below, will be readily apparent to those skilled in the art with the aid of this disclosure upon reading the following detailed description, and by referring to the accompanying drawings.

Dispersion analysis can be generally divided by complexity into basic answer products and advanced answer products, both of which make use of dispersion curves. Most basic answer products, such as slowness estimation of P-waves (primary waves) and S-waves (shear waves), use an estimated dispersion curve. For instance, low-frequency leaky P-waves can be used to estimate P-wave slowness in a soft formation, and low-frequency flexural waves can be used to estimate S-wave slowness for an arbitrary formation. However, a higher quality dispersion curve could produce a corresponding increase in the quality of this slowness estimation. For advanced answer products, such as radial profiling of shear wave slowness, dispersion curves of high quality are essential; the inversion of radial shear wave slowness simply will not be accurate without a high bandwidth dispersion curve as input.

More generally, and more importantly, high quality dispersion curves enable a greater variety of advanced processing strategies, including data-driven processing methods that introduce several adjustable parameters in order to provide an improved fit between modeled data and measured data, even under extremely difficult conditions. In other words, higher quality dispersion data is essential for models to more closely predict the reality of rock formation properties.

Conventional model-driven methods are often hamstrung by a requirement for sweeping theoretical assumptions that are often unrealistic for a real well (e.g. an assumption of formation homogeneity, as opposed to the real-world formation heterogeneity). Compared to these conventional methods, the presently disclosed method does not require any special assumptions and greatly increases the reliability of the calculated results.

In particular, conventional multi-mode dispersion analysis makes an assumption of formation homogeneity because the analysis otherwise becomes too complex and unreliable for use. In a strong heterogeneous rock formation, there are interfaces of abrupt acoustic impedance changes that introduce reflected waves and converted waves into the measured waveform train, which can lead to strong interference in the dispersion analysis of the desired target modes. Moreover, strong heterogeneity may contribute to asymmetrical borehole behavior, which subsequently causes wave motions of different azimuthal orders to be excited, leading to further interfering signals in the dispersion analysis of the target modes. As such, when using conventional multi-mode dispersion analysis, it is unadvisable to separate the target modes from the non-target modes in a strong heterogeneous formation. Processing heterogeneous formation waveform trains with conventional multi-mode dispersion analysis methods is likely to generate ghost modes in the inversion, further muddying the results, or even invalidating them altogether.

Outside of the issues presented by a heterogeneous formation, miscellaneous sources of noise abound. Tool waves propagating along the tool, road noises generated by friction between the tool shell and the borehole sidewall, and other formation noise can all contaminate the waveform trains of the desired target modes. Further still, field operations often apply data compression algorithms to reduce the volume of telemetry data that must be transmitted to the surface via a limited bandwidth wireline cable. These data compression algorithms are generally lossy, irrevocably introducing further noise into the measured waveform trains. As such, the dispersion curves of target modes extracted using conventional dispersion processing are generally understood to be of poor quality due to complicated borehole environments.

Some specific borehole modes have low-frequency asymptotes that approach a rock formation body wave, and as such, may be utilized for rock formation body wave estimation. However, this technique has been difficult to achieve in practice, as, viewed another way, as the borehole wave slowness approaches the body wave slowness, the excitation amplitude of the body wave approaches zero. Consequently, these low-frequency asymptotes are inherently associated with a poor SNR and small amplitudes, and are thus easily biased by noises or other borehole waves, as discussed above.

Consequently, disclosed herein is a method to both improve the SNR of target modes and suppress any non-target modes. The disclosed technology addresses this need by making use of wave travel time (TT) curves calculated for each receiver on an acoustic logging tool. Using these calculated TT curves, the measured waveform trains that are collected by each receiver can be shifted along the depth axis of the borehole to better condition the waveform trains for adaptive filtering. In general, this adaptive filtering is applied to the waveform data to enhance the SNR of selected target modes while simultaneously suppressing the amplitude of (or eliminating) non-target modes and noises. Once the adaptively filtered data is again conditioned with the TT curves, enhanced dispersion curves can be calculated in a more accurate manner than previously possible.

Data Collection

The disclosure now turns to FIG. 1, which illustrates a diagrammatic view of an exemplary logging while drilling (LWD) and/or measurement while drilling (MWD) wellbore operating environment 100 in which the present disclosure may be implemented. As depicted in FIG. 1, a drilling platform 102 is equipped with a derrick 104 that supports a hoist 106 for raising and lowering a drill string 108. The hoist 106 suspends a top drive 110 suitable for rotating the drill string 108 and lowering the drill string 108 through the well head 112. Connected to the lower end of the drill string 108 is a drill bit 114. As the drill bit 114 rotates, the drill bit 114 creates a wellbore 116 that passes through various formations 118. A pump 120 circulates drilling fluid through a supply pipe 122 to top drive 110, down through the interior of drill string 108, through orifices in drill bit 114, back to the surface via the annulus around drill string 108, and into a retention pit 124. The drilling fluid transports cuttings from the wellbore 116 into the pit 124 and aids in maintaining the integrity of the wellbore 116. Various materials can be used for drilling fluid, including oil-based fluids and water-based fluids.

As depicted in FIG. 1, logging tools 126 are integrated into the bottom-hole assembly 125 near the drill bit 114. As the drill bit 114 extends the wellbore 116 through the formations 118, logging tools 126 collect measurements relating to various formation properties as well as the orientation of the tool and various other drilling conditions. The bottom-hole assembly 125 may also include a telemetry sub 128 to transfer measurement data to a surface receiver 130 and to receive commands from the surface. In some embodiments, the telemetry sub 128 communicates with a surface receiver 130 using mud pulse telemetry. In other cases, the telemetry sub 128 does not communicate with the surface, but rather stores logging data for later retrieval at the surface when the logging assembly is recovered.

Each of the logging tools 126 may include a plurality of tool components, spaced apart from each other, and communicatively coupled with one or more wires. Logging tools 126 may include tools such as those shown in FIGS. 3-4 in order to perform acoustic (e.g., "sonic") logging. For example, acoustic logging tools can include transmitters (e.g., monopole, dipole, quadrupole, etc.) to generate and transmit acoustic signals/waves into the borehole environment. These acoustic signals subsequently propagate in and along the borehole and surrounding formation and create acoustic signal responses or waveforms, which are received/recorded by evenly spaced receivers. These receivers may be arranged in an array and may be evenly spaced apart to facilitate capturing and processing acoustic response signals at specific intervals. The acoustic response signals are further analyzed to determine borehole and adjacent formation properties and/or characteristics. The telemetry sub 128 may include wireless telemetry or logging capabilities, or both, such as to transmit or later provide information indicative of received acoustic energy/waveforms to operators on the surface or for later access and data processing for the evaluation of formation 118 properties.

The logging tools 126, including the acoustic logging tool, may also include one or more computing devices 150 communicatively coupled with one or more of the plurality of tool components. The computing device 150 may be configured to control or monitor the performance of the tools 126, process logging data, and/or carry out the methods of the present disclosure.

In some embodiments, one or more of the logging tools 126 may communicate with a surface receiver 130, such as wired drillpipe. In other cases, the one or more of the logging tools 126 may communicate with a surface receiver 130 by wireless signal transmission. In at least some cases, one or more of the logging tools 126 may receive electrical power from a wire that extends to the surface, including wires extending through a wired drillpipe. In at least some instances the methods and techniques of the present disclosure may be performed by a computing device (not shown) on the surface. In some embodiments, the computing device may be included in surface receiver 130. For example, surface receiver 130 of wellbore operating environment 100 at the surface may include one or more of wireless telemetry, processor circuitry, or memory facilities, such as to support substantially real-time processing of data received from one or more of the logging tools 126. In some embodiments, data is processed at some time subsequent to its collection, wherein the data may be stored on the surface at surface receiver 130, stored downhole in telemetry sub 128, or both, until it is retrieved for processing.

Figure 2:
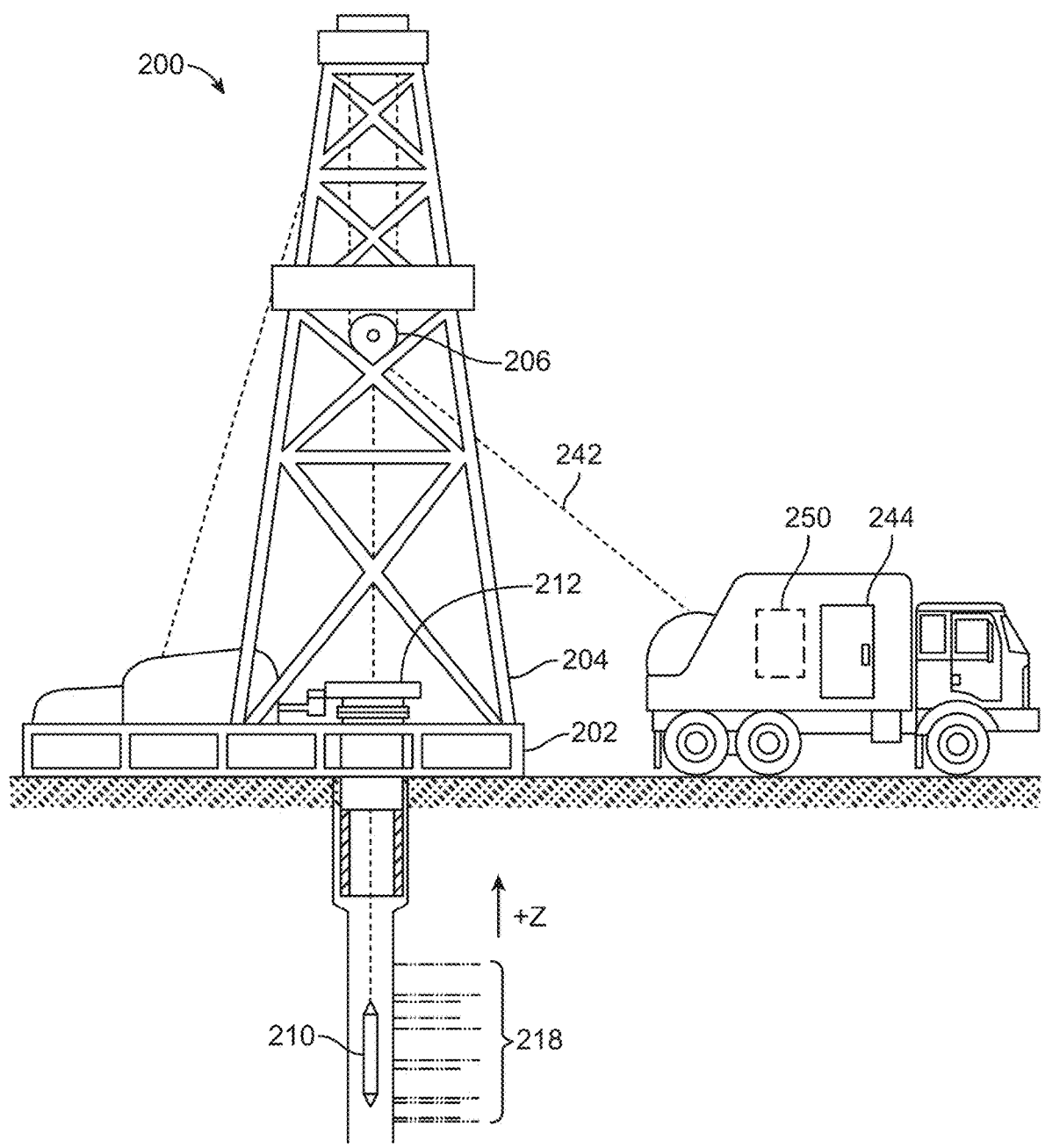
FIG. 2 illustrates a diagrammatic view of a conveyance logging wellbore operating environment.

FIG. 2 illustrates a diagrammatic view of a conveyance logging wellbore operating environment 200 (also referred to as "wireline" in the field) in which the present disclosure may be implemented. As depicted in FIG. 2, a hoist 206 may be included as a portion of a platform 202, such as that coupled to derrick 204, and used with a conveyance 242 to raise or lower equipment such as acoustic logging tool 210 into or out of a borehole. Acoustic logging tool 210 may include, for example, tools such as those shown in FIGS. 3-4. A conveyance 242 may provide a communicative coupling between the acoustic logging tool 210 and a logging facility 244 at the surface. The conveyance 242 may include wires (one or more wires), slicklines, cables, or the like, as well as tubular conveyances such as coiled tubing, joint tubing, or other tubulars, and may include a downhole tractor. Additionally, power can be supplied via the conveyance 242 to meet power requirements of the tool. The acoustic logging tool 210 may have a local power supply, such as batteries, downhole generator and the like. When employing non-conductive cable, coiled tubing, pipe string, or downhole tractor, communication may be supported using, for example, wireless protocols (e.g. EM, acoustic, etc.), and/or measurements and logging data may be stored in local memory for subsequent retrieval. The logging facility 244 may include a computing device 250 capable of carrying out the methods and techniques of the present disclosure. In this manner, information about the formation 218 may be obtained by acoustic logging tool 210 and processed by a computing device, such as computing device 250. In some embodiments, computing device 250 is equipped to process the received information in substantially real-time, while in some embodiments, computing device 250 can be equipped to store the received information for processing at some subsequent time.

Figure 3:
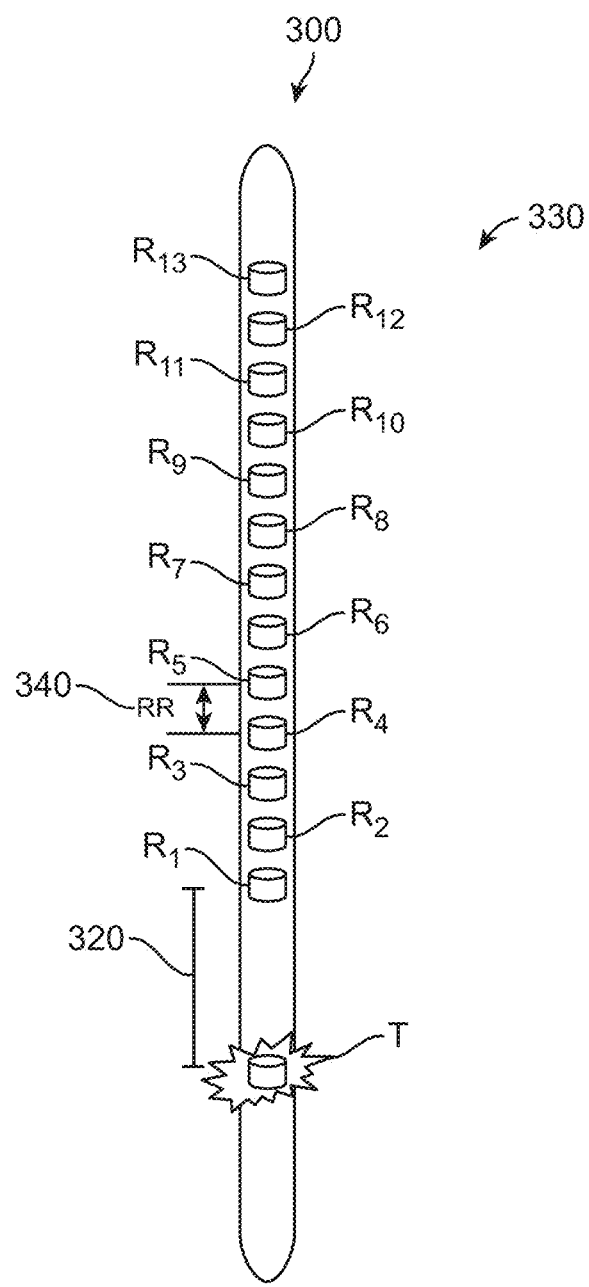
FIG. 3 illustrates a diagrammatic view of an acoustic logging tool.

FIG. 3 illustrates a diagrammatic view of an acoustic logging tool 300 capable of performing the presently disclosed methods and techniques in accordance with certain exemplary embodiments of the present disclosure. As depicted in FIG. 3, acoustic logging tool 300 includes at least one transmitter, T, capable of exciting acoustic signals/waves of different azimuthal orders, although additional transmitters may be provided as desired. Acoustic logging tool 300 further includes a receiver array 330 comprising a number of receivers, illustrated here as thirteen receivers $R_1$-$R_{13}$. The receivers may be evenly spaced along logging tool 300, or may be arranged in other patterns as desired. As illustrated, receivers $R_1$-$R_{13}$ are evenly spaced with a spacing 340 of 0.5 feet, similar to the Xaminer® Sonic Image Tool (XSI), available from Halliburton Energy Services, Inc.

As illustrated, transmitter T is separated from the first receiver $R_1$ by a spacing 320, illustrated here as approximately nine feet. The large-span receiver array is capable of capturing an acoustic wave field of different azimuthal orders. In such an acoustic logging tool 300, the axial resolution of slowness logs can vary with different sub-array processings. Generally, the axial resolution of an extracted slowness curve is between the receiver to receiver spacing and the array size, which may be from about 0.5 feet to about 6 feet, depending on the size of the sub array.

Figure 4:
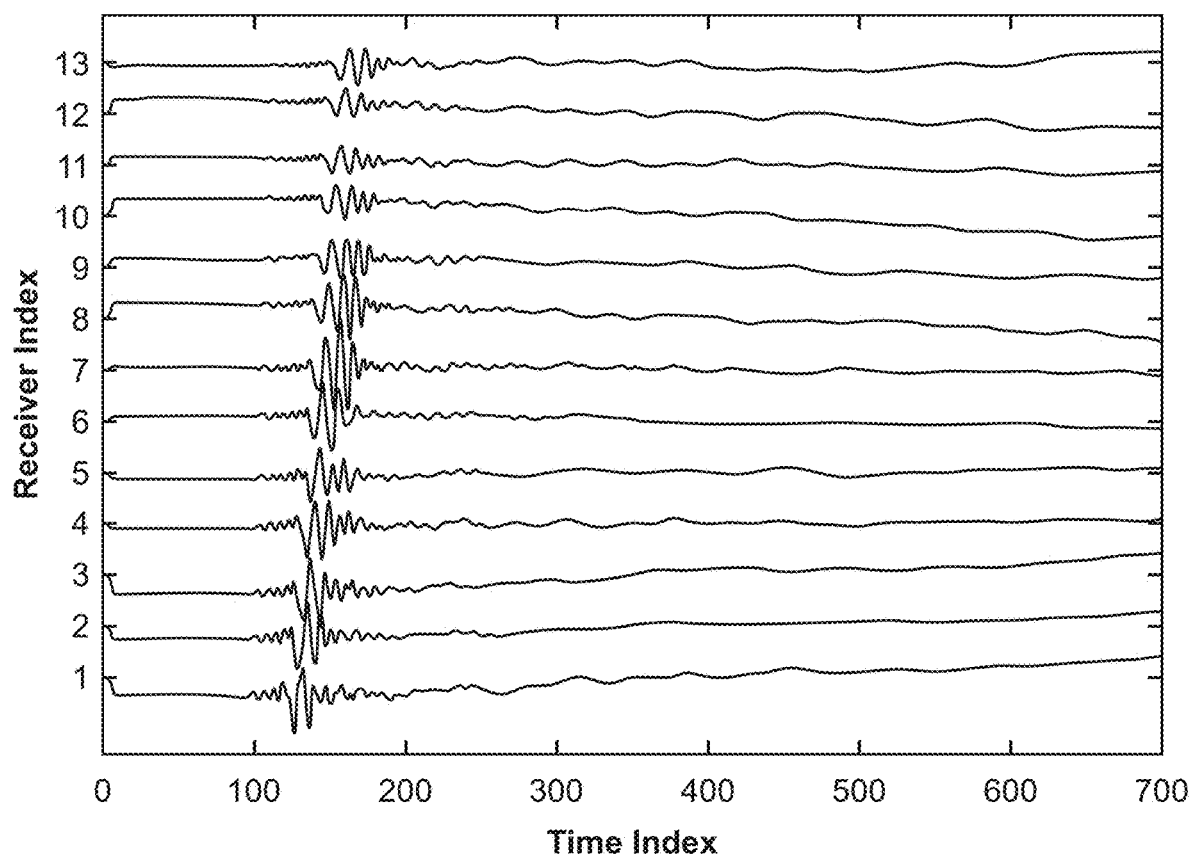
FIG. 4 illustrates waveform trains of a single depth acquisition of an acoustic logging tool.

FIG. 4 depicts exemplary waveform trains of a single depth acquisition as recorded by the thirteen receivers of the acoustic logging tool 300 of FIG. 3. At some time index less than 0, transmitter T generated an acoustic wave in a borehole. The acoustic wave then propagates along the borehole, through the transmitter-receiver separation 320, before first reaching receiver $R_1$, as indicated by the fact that receiver $R_1$ is the first to record waveform data. The same acoustic wave continues onward, past receivers $R_2$-$R_{13}$, where it is recorded in turn. Note that, while these 13 waveforms are all a consequence of the same original acoustic wave, they are not identical, with each waveform train containing variations induced by formation properties (desirable) and noise (un-desirable). As disclosed herein, these raw measured waveform trains may be enhanced to isolate desired target modes for analysis while suppressing noise and non-target modes.

Figure 5:
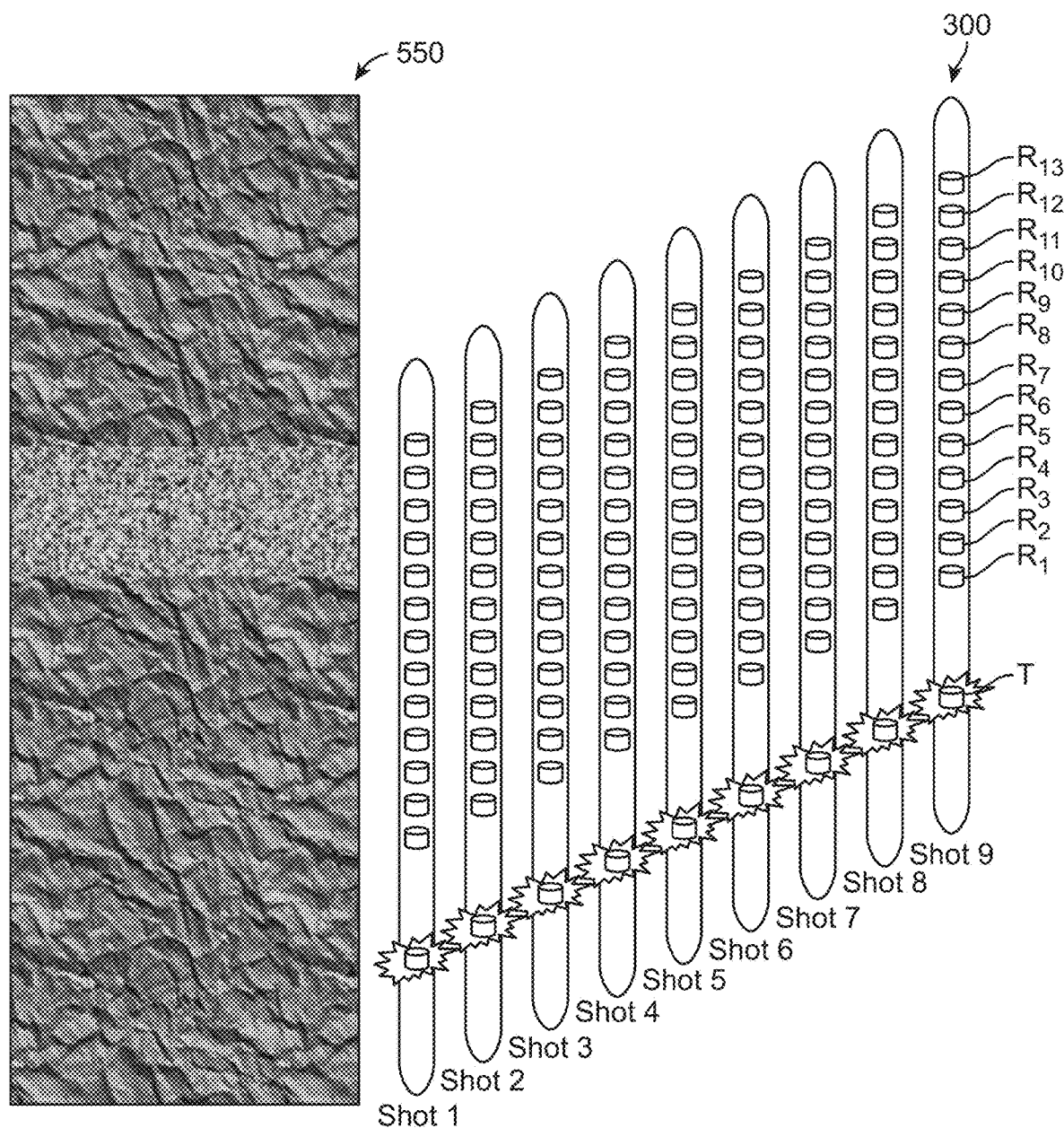
FIG. 5 illustrates a diagrammatic view of an acoustic logging tool at various shot positions.

In order to gain a more comprehensive data set, multiple depth acquisitions are typically made. That is, acoustic logging tool is moved to various shot positions within the borehole, and makes a depth acquisition at each. FIG. 5 illustrates a diagrammatic view of acoustic logging tool 300 lowered in a borehole in a formation 550 in order to collect waveform trains at a plurality of shot positions. In the context of the disclosure, a shot position refers to a particular depth index within a borehole. As depicted in FIG. 5, the acoustic logging tool 300 may be lowered to a first depth index in the borehole corresponding to the position indicated by 'Shot 1', followed by firing the transmitter and capturing waveform trains at each receiver $R_1$-$R_{13}$ of the receiver array. Acoustic logging tool 300 may then be raised to a second depth index in the borehole corresponding to the position indicated by 'Shot 2', and the measurement process repeated. This measurement process may be repeated as many times as desired, such that each receiver $R_1$-$R_{13}$ measures a waveform train at each selected depth index. Although FIG. 5 depicts a scenario in which acoustic logging tool 300 is raised into subsequent shot positions, acoustic logging tool 300 can begin in the position indicated by 'Shot 9' and be successively lowered into the position indicated by 'Shot 1', or may be moved through any other desired order of measurement positions. In this manner, abundant waveform trains can be collected in a borehole. As depicted, once the sampling process is complete, acoustic logging tool 300 will have acquired 117 waveform trains—13 receivers each acquiring 9 waveform trains. In some embodiments, the measured waveform trains can be organized based on their offset, or distance, from the transmitter T. This is generally known as a common-offset gather. In some embodiments, the measured waveform trains can be organized based on the receiver position where they were received (i.e. a receiver depth position). This is generally known as a common-receiver gather.

In the particular case of acoustic logging tool 300, the receivers $R_1$-$R_{13}$ are all spaced apart along the longitudinal axis of logging tool 300 (i.e. they are all a different distance from the transmitter). In some embodiments, data captured with acoustic logging tool 300 can be organized into a common-offset gather, referring to a set of data fired by the same transmitter and captured by the same receiver at various different depth positions, i.e. different shots. Various other gathers are also known in the art, and may likewise be employed in the present disclosure.

Presented below is an example process for generating enhanced waveforms for a single receiver, $R_1$, although the process is extensible to any number of receivers provided on an acoustic logging tool. Similarly, while the Figures are directed to the specific example of receiver $R_1$, it is understood that they are representative of any receiver employed in accordance with the present disclosure. Specific reference is made to a common-offset gather $COG_1$ for receiver $R_1$, although it is understood that various other gathers known in the art may be employed.

Enhancing Waveform Trains of a Common Gather

The disclosure now turns to a specific example of enhancing waveform trains of a common gather, wherein the common gather is the common-offset gather $COG_1$ with receiver $R_1$. The example makes use of logging tool 300, although it is appreciated that other logging tools with various transmitter and receiver configurations can be employed without departing from the scope of the present disclosure. While the concept of a common-offset gather is explained above, a visual representation of common-offset gather $COG_1$ can be seen in the VDL display 701 of FIG. 7A, discussed further below. This example is directed towards calculating flexural dispersion in a soft formation borehole, although it is understood that the disclosed method may be similarly applied to any borehole dispersion analysis.

The example assumes that logging tool 300 (as in FIG. 5) has been used to take 51 single depth acquisitions, as described above, at depth indices 1-51. Thus, common-offset gather $COG_1$ consists of 51 waveform trains—one for each depth index. (12 other common-offset gathers $COG_2$. $COG_n$ may also be recorded, although again, the present example is only directed to common-offset gather $COG_1$).

Figures 6A, 6B:
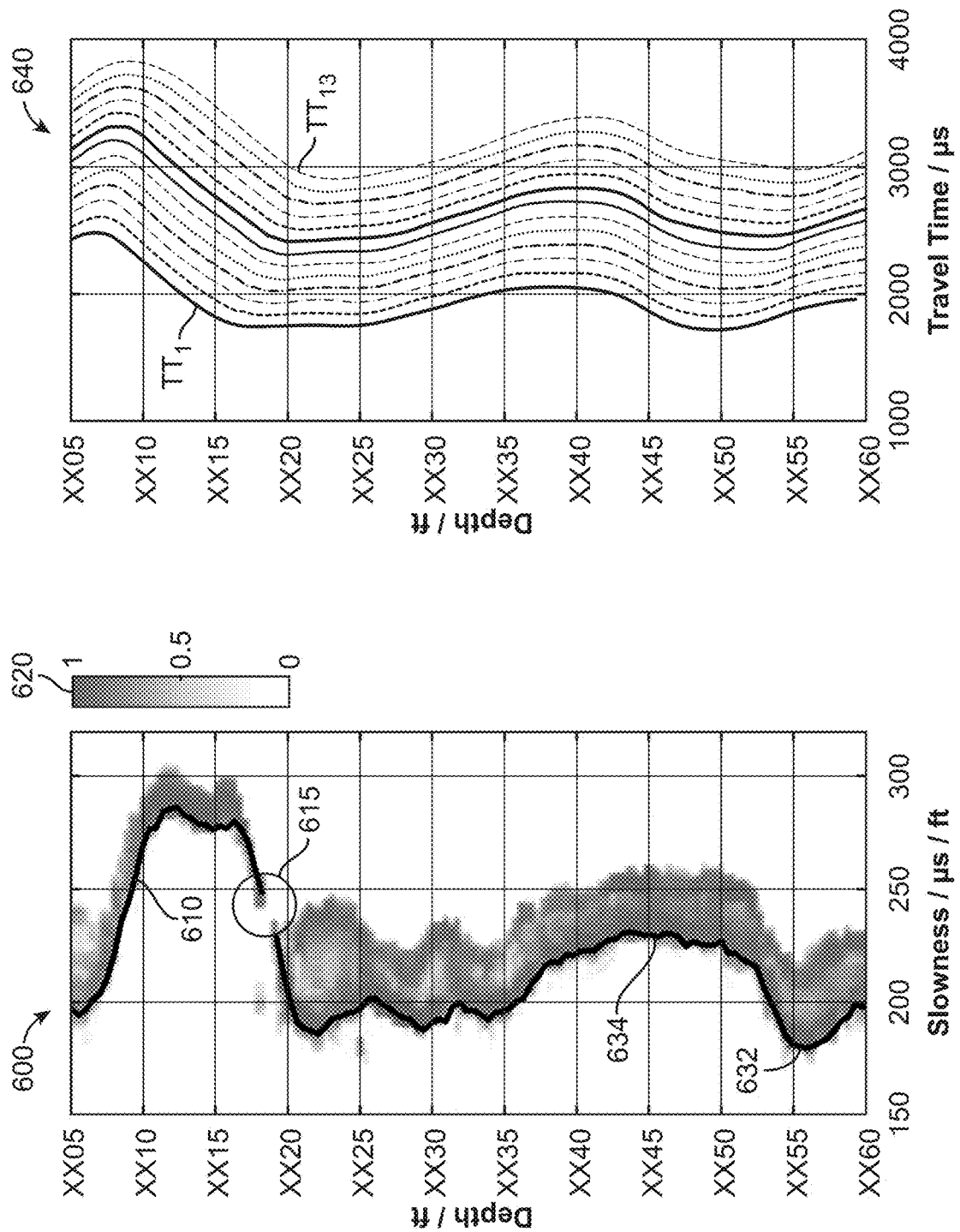
FIG. 6A illustrates a graph of shear wave slowness.
FIG. 6B illustrates a graph of travel time curves.

FIG. 6A depicts a graph 600 of the extracted shear wave slowness 510 of the measured data set, overlaid with its dispersion QC metrics 520. Although the two leading digits of each depth measurement have been obfuscated and replaced with an 'X', the spacing between consecutive depth labels is consistent, e.g. five feet separates X,X05 from X,X10, which is itself separated by a further five feet from X,X15, and so on. In the context of logging tool 300 (as in FIG. 5), graph 600 can be obtained by obtaining measurements at multiple shot positions in the borehole. For example, a single shot with the 13 receivers of logging tool 300 will allow one slowness value at the specific shot depth to be extracted. Repeating the measurement and processing over all depths allows graph 600 to be constructed to obtain extracted shear wave slowness 510, also known as delta-T logs (DTXX), and the dispersion QC metrics 520. In other words, graph 600 can be obtained by processing all 13 receivers (or however many receivers are provided on a given logging tool), depth by depth.

In this example, flexural waves are the selected target mode, because their low-frequency asymptote approaches the shear wave slowness of the surrounding rock formation. Graph 600 presents relatively low quality information—the dispersion QC metrics 620 display a discontinuity 615 versus depth and the shear wave slowness 610 jitters—suggesting that the measured waveform trains of common-offset gather $COG_1$ are contaminated by the presence of noise and non-target modes. Taken in combination, the discontinuities, the jitter, and the missing data are highly undesirable when conducting any dispersion analysis, and can make any advanced processing impossible to perform.

Graph 600 is also indicative of the effects of formation heterogeneity, or layers with different physical and geological properties. This is most evident through the multiple variations of slowness with depth, as a given wave will travel either faster or slower through various materials. Recalling, from FIG. 3, that an acoustic wave travels a fixed distance 320 (i.e. a common offset) from transmitter T to receiver $R_1$ in each of the 51 acquisitions, it becomes apparent as to why formation heterogeneity is manifest in this shear wave slowness curve 510. For example, depth 632 indicates an approximate slowness of 180 μs/ft, and depth 634 indicates an approximate slowness of 225 μs/ft These slowness values can be indicative of the fact that the formation composition changes between depth 632 and depth 634, as is appreciated by one of ordinary skill in the art.

However, it can also be desirable to mitigate this effect of formation heterogeneity by aligning the arrival time of flexural waves (i.e. the target mode waves) in all 51 of the waveform trains contained in common-offset gather $COG_1$. Such a process begins by calculating travel time (TT) curves for the selected target mode FIG. 6B depicts travel time curves 640 that have been calculated for the 13 receivers $R_1$-$R_{13}$, where each receivers has a corresponding calculated travel time curve $TT_1$-$TT_{13}$. The two leading digits of each measurement have been obfuscated with an 'X', as in FIG. 6A. It is noted that FIGS. 6A and 6B share a common vertical axis, e.g. X,X05 indicates the same depth in both of the figures. While the present example is directed only to receiver $R_1$, it can be desirable, in the interest of time and efficiency, to calculate travel time curves for all of the receivers at the same time. In general, these travel time curves reflect the ability of the formation, at a given depth, to transmit acoustic waves. For example, the formation is slower, and has a longer travel time, at X,X45 feet than at X,X55 feet. In order to generate the travel time curves, the wave slowness is integrated according to the following equation, $$TT_n(z) \approx \int_{z=z_T}^{z=z_{Rn}} s(z)dz + \int_{r=r_T}^{r=r(z)} s_{mud} dr + \int_{r=r_R}^{r=r(z)} s_{mud} dr \quad (1)$$

wherein n represents the receiver index (e.g. 1-13), s represents the approximate wave slowness of the target mode (e.g. wave slowness 510 of FIG. 5A), and $s_{mud}$ denotes mud slowness, a known property. $z_T$ and $z_R$ represent the depths of the transmitter and the receiver for the current acquisition, respectively, and $r_T$ and $r_R$ represent the radial positions of the transmitter and the receiver, respectively. $r(z)$ denotes radius data corresponding to the borehole being measured. Generally three items are included in the equation, where the left one $$\int_{z=z_T}^{z=z_{Rn}} s(z)dz$$

is the wave travel time along the formation, and the right two items $$\int_{r=r_T}^{r=r(z)} s_{mud} dr + \int_{r=r_R}^{r=r(z)} s_{mud} dr$$

represent the wave motion delays across the borehole fluid.

Once calculated, travel time curve $TT_1$ can be used to align the flexural waves (i.e. target mode waves) of common-offset gather $COG_1$, such that the flexural waves measured at each depth index all have the same arrival time, or in other words, have zero apparent slowness/wave number. In some embodiments, it may be desirable to simultaneously perform this alignment on the remaining common-offset gathers $COG_2$-$COG_{13}$ using the travel time curves $TT_2$-$TT_{13}$.

Figure 7A:
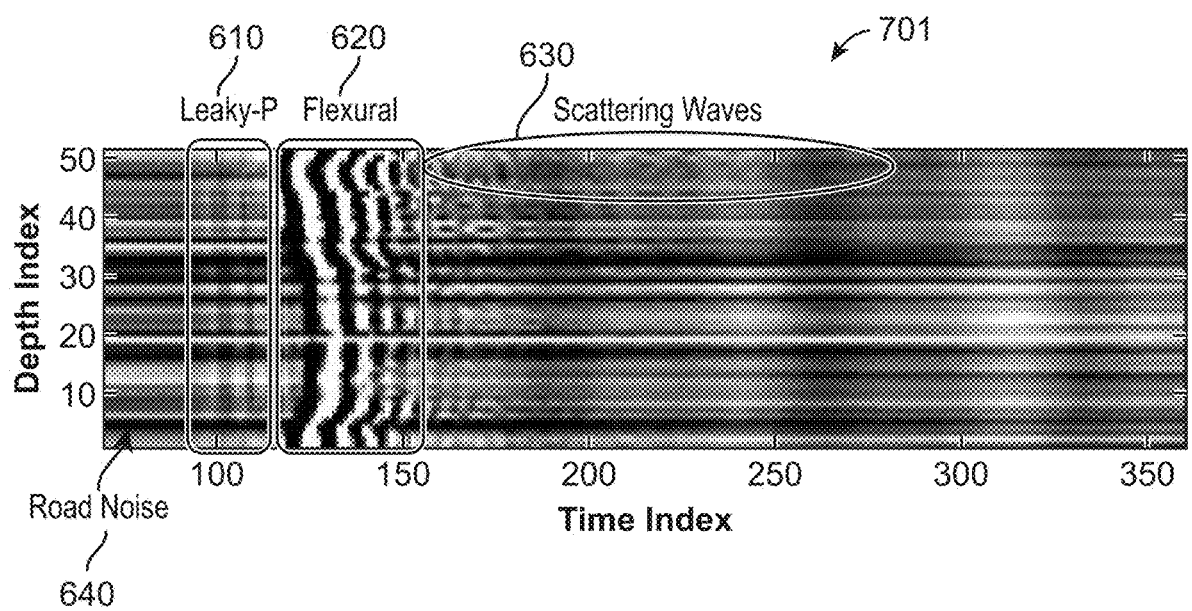
FIG. 7A illustrates a variable density log display of waveform trains of a common-offset gather.

Specific reference is now made to FIG. 7A, which presents the measured waveform trains of common-offset gather $COG_1$ in a variable density log (VDL) display 701. Viewed differently, each horizontal band of VDL display 701 represents a single waveform train measured by receiver $R_1$, and as illustrated, has an approximate resolution of 0.5 feet, although other resolutions may be achieved with different receiver and sonic logging tool configurations. Upon examination, leaky-P waves 710, flexural waves 720, scattering waves (S-waves) 730, and road noise 740 are visible across all 51 waveform trains of common-offset gather $COG_1$. In order to enhance the waveform trains of $COG_1$, it is desirable to eliminate or reduce the presence of all but the target mode flexural waves 720.

In order to do so, the travel time curves 640 are used to compensate for formation heterogeneity by adjusting the arrival time of the flexural waves as follows:

$$WAV(t,z) = WAV_{raw}(t - TT(z), z) \quad (2)$$

where $WAV_{raw}$ and WAV denote waveform trains before and after the alignments, t denotes the time index, and z denotes the depth index along the borehole. In the present example, Equation (2) is applied 51 times, once for each of the waveform trains obtained at depth index z=1, . . . , 51.

Figure 7B:
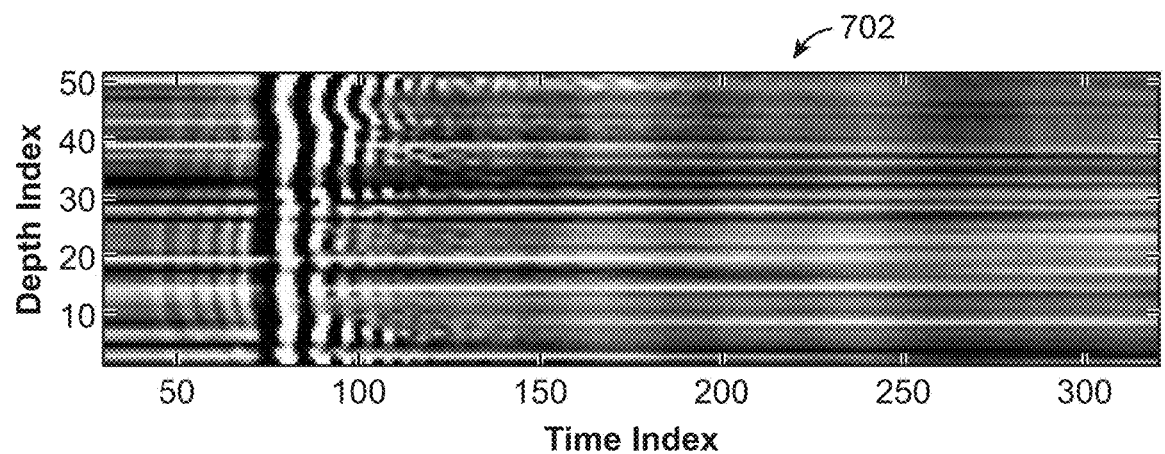
FIG. 7B illustrates a variable density log display of aligned waveform trains of a common-offset gather.

The results of aligning the common-offset gather $COG_1$ are seen in VDL display 702 of FIG. 7B. Note that the flexural waves are now aligned to have substantially the same arrival time, regardless of the depth index at which a waveform train was recorded (i.e. the black and white wave fronts seen in the area of flexural waves are now substantially vertical and straight, instead of curved). Indeed, after alignment, the target mode flexural waves are the waves that have the same arrival time (zero apparent slowness/wave number) at different depths, while all other, non-target modes have different arrival times at different depths.

In order to suppress or remove these non-target modes and any noises, an adaptive filter is applied to the aligned waveform trains, as described below. However, before applying the adaptive filter, the aligned common-offset gather $COG_1$ must first be transformed from the time domain into the frequency-wavenumber (F-K) domain. The transformation can be provided via a two-dimensional Fast Fourier Transform (FFT) as follows:

$$XX(f,k) = fft2(WAV(t,z)) \quad (3)$$

where fft2 represents the two-dimensional FFT function, WAV(t, z) represents the aligned waveform trains from Equation (2), and XX(f, k) represents the transformed waveform trains.

Figure 8A:
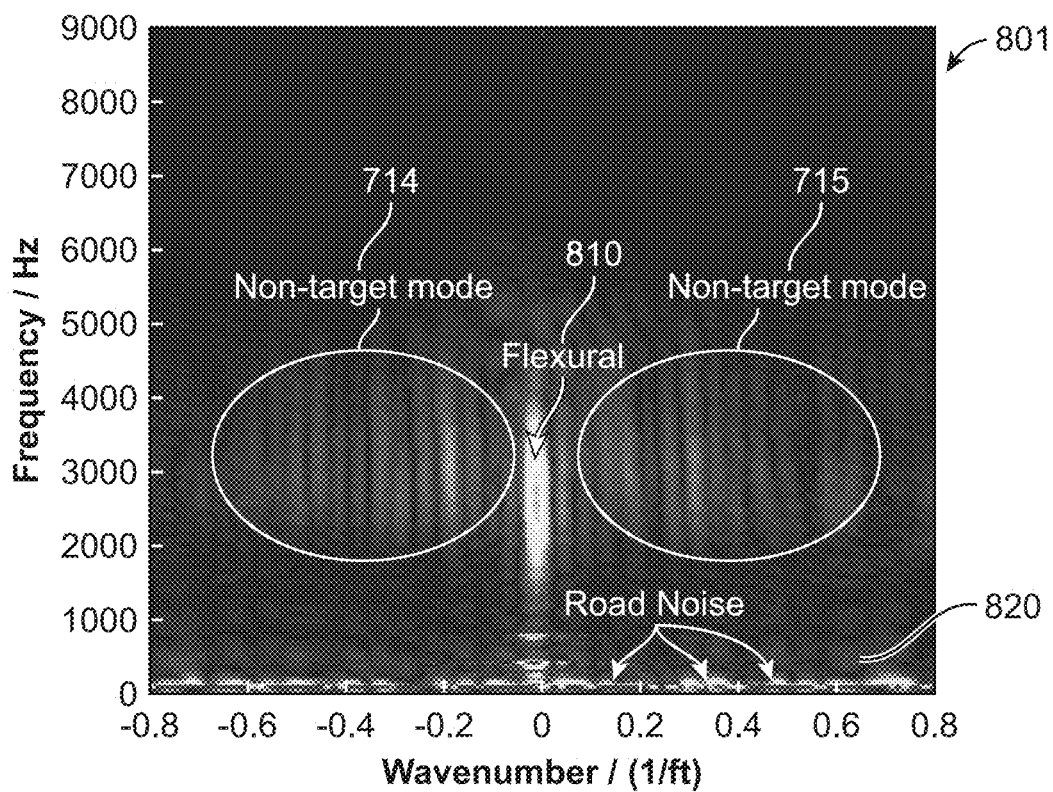
FIG. 8A illustrates waveform trains of a common-offset gather transformed into the F-K domain.

FIG. 8A presents an F-K depiction 801 of the transformed waveform trains of the aligned common-offset gather $COG_1$, i.e. the waveform trains seen in VDL display 702 of FIG. 7B after undergoing the 2D FFT described in Equation (3). The target mode flexural waves 810 form a clear cluster concentrated along a vertical axis of zero-wavenumber. Two areas of non-target mode waves, 714 and 715, are visible to the left and right, respectively, of the flexural waves 810. Low frequency road noise 820 is seen in the low frequencies, across a wide variety of wavenumbers.

Zero-padding may also be applied while performing the 2D FFT, particularly in cases where a limited number of samples in depth (i.e. number of depth indices) are available.

It is possible that the data have limited sampling in the depth axis due to optimizations required to maintain both the accuracy and resolution of the final processing results. This limited data in depth manifests itself as sparse spectral data along the wavenumber axis in the F-K domain. To solve this problem, some embodiments may employ zero padding after the main waveform data along the depth axis.

Once the aligned common-offset gather $COG_1$ waveform trains are transformed to the F-K domain, the transformed waveform trains can be filtered, in this case via the application of an adaptive filter. The adaptive filter is designed to pass all waveform trains having the same arrival time and to decrease the amplitude of waveform trains having different or random arrival times. In some embodiments, the adaptive filter can be designed to decrease the amplitude of noise. Various filters can be used to provide a framework for this adaptive filter, including the median filter, the discrete Radon transform (DRT), or the frequency-wavenumber (F-K) filter. Discussed below is an adaptive filter based on the F-K filter, although it is understood that other adaptive filters can be employed without departing from the scope of the present disclosure.

Figure 9:
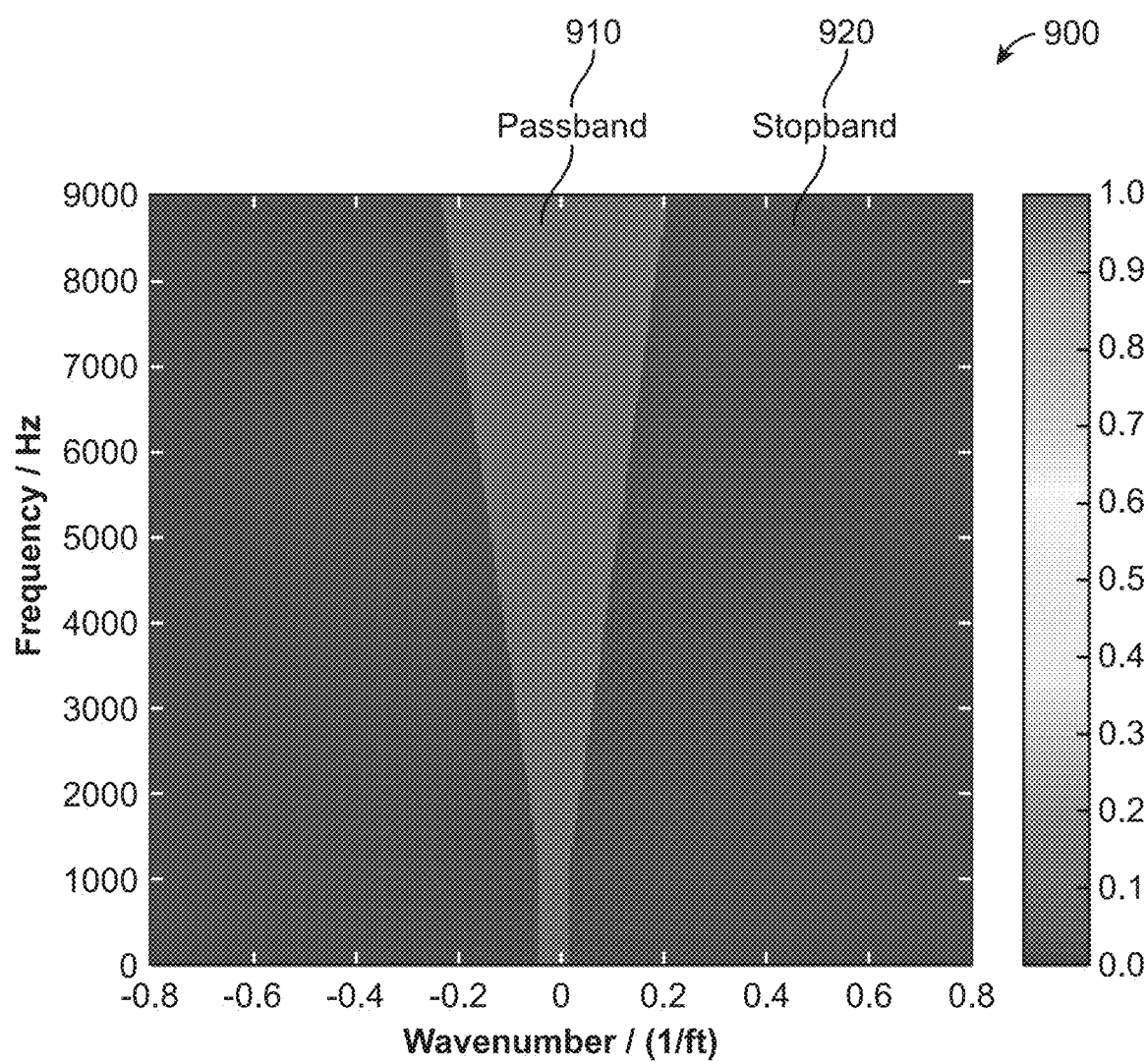
FIG. 9 illustrates a fan-shaped F-K filter.

FIG. 9 depicts an exemplary F-K filter 900, with a fan-shaped passband 910 and a stopband 920. It is noted that, of course, F-K filter 900 is shown in the F-K domain, rather than the time domain. F-K filter 900 can be constructed with the function fil(f, k), as follows:

$$fil(f, k) = \begin{cases} 1 & \text{if } k < \max(k_{Thr}, 2\pi f s_{Thr}) \text{ and } k > -\max(k_{Thr}, 2\pi f s_{Thr}) \\ 0 & \text{else} \end{cases} \quad (4)$$

where f denotes frequency, k denotes wavenumber (measured here in ft$^{-1}$), $k_{Thr}$ denotes a wavenumber lower threshold, and $s_{Thr}$ denotes an apparent slowness lower threshold. By adjusting the wavenumber threshold $k_{Thr}$ and the apparent slowness threshold $s_{Thr}$, F-K filter 900 can be adapted as need or desired in order to filter various transformed waveform trains.

With F-K filter 900 constructed, filtered transformed waveform trains XX'(f, k) can be obtained as follows:

$$xx'(f,k)=XX(f,k)*fil(f,k). \quad (5)$$

where XX(f, k) represents the transformed waveform trains of aligned common-offset gather $COG_1$ and fil(k) represents F-K filter 900 as described in Equation (4), although it is understood that various other filters may be applied without departing from the scope of the present disclosure.

Figure 8B:
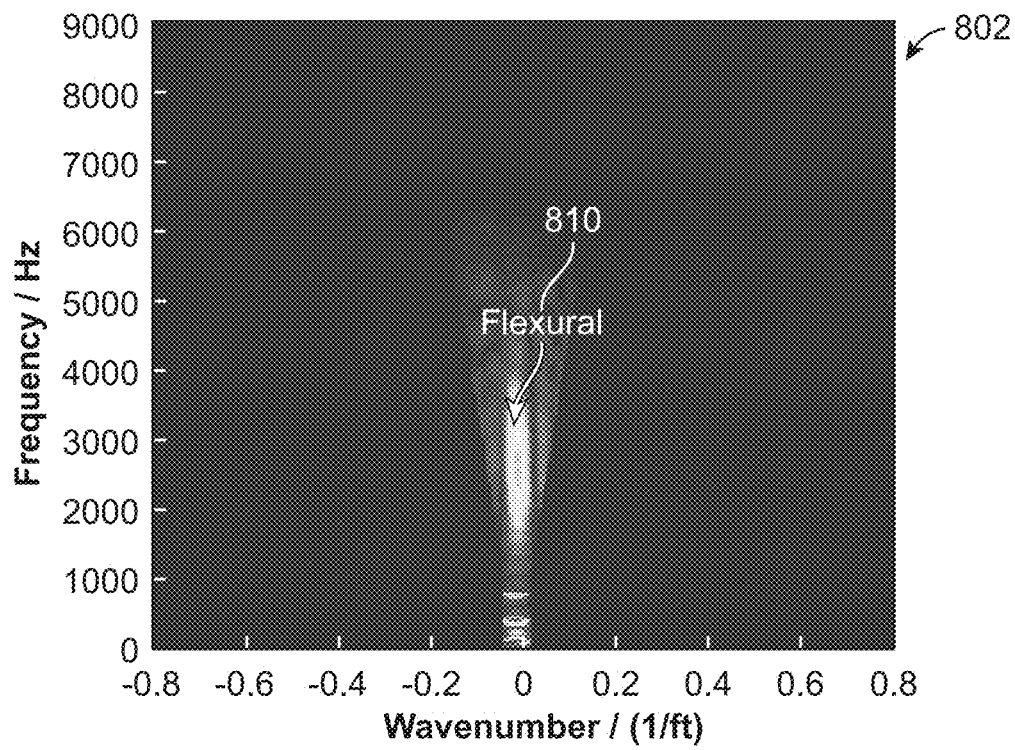
FIG. 8B illustrates the waveform trains of FIG. 8A after being filtered.

The filtered transformed waveform trains XX'(f, k) are illustrated in F-K depiction 802 of FIG. 8B, where it can be seen that the flexural waves 810 have passed through the filter unchanged, while the previously present areas of non-target mode waves 814, 815, and road noise 820 have been suppressed and eliminated. The transformation to the frequency domain allows the aligned target mode waveform trains to be identified and preserved in a more efficient fashion, while likewise permitting the more efficient filtering and removal of non-target mode waves and noise.

In some embodiments, an adaptive F-K filter can be constructed based on the set of measured waveforms themselves, using a coherence function. A coherence map between waveforms at different depths can be calculated within wavenumber (−k, k) and frequencies (0, f) to form a coherence-based F-K filter $fil_{coh}(f, k)$, which passes strongly coherent signals and suppresses in-coherent noise:

$$fil_{coh}(f, k) = \frac{\left| \sum_{n=1}^{N} X_n^*(f)\exp(-ikd(n-1)) \right|}{\sqrt{N \sum_{n=1}^{N} X_n^*(f) X_n(f)}} \quad (6)$$

where f once again denotes frequency and k denotes wavenumber, N represents the total number of waveforms, n represents waveform index, $X_n$ represent the spectral of the nth waveforms in the frequency domain, $X_n$* denotes the complex conjugate of $X_n$, and d denotes an averaged sampling depth interval of the waveform data. The coherence-based F-K filter can be added to the fan-shaped F-K filter 900 to yield an adaptive F-K filter that only allows the desired (i.e. target mode) and best coherence signals to pass through, as follows (wherein the * represents the convolution operator):

$$fil'(f,k)=fil(f,k)*fil_{coh}(f,k) \quad (7)$$

The filters described in Equations (6) and (7) may be substituted into Equation (5) and replace F-K filter 900 in generating the filtered transformed waveform trains XX'(f, k). It is further appreciated that various other filters may be utilized in conjunction with Equation (5) as desired, either in substitution or supplementation of F-K filter 900.

After being filtered, it is no longer necessary for the waveform trains to remain in the F-K domain. Filtered time domain waveform trains can be recovered from the filtered transformed waveform trains via an inverse two-dimensional FFT:

$$WAV'(t,z)=ifft2(XX'(f,k)) \quad (8)$$

where WAV'(t, z) represents the filtered waveform trains in the time domain, ifft2 represents the inverse 2D FFT function, and XX'(f, k) represents the filtered transformed waveform trains from Equation (5).

Figure 10A:
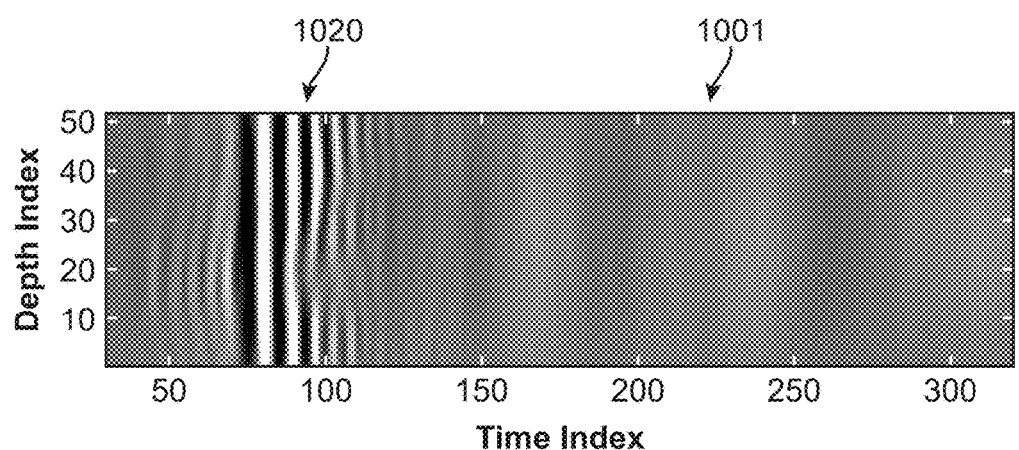
FIG. 10A illustrates a variable density log display of filtered waveform trains of a common-offset gather.

FIG. 10A illustrates a VDL display 1001 of the filtered waveform trains described in Equation (8). Compared to the unfiltered waveform trains seen in VDL display 702, the filtered waveform trains no longer contain non-target modes (e.g. leaky-P waves, scattering waves) and noise (e.g. road noise). Instead, only aligned flexural waveforms 1020 remain. Flexural waveforms 1020 have had substantial jitter and other noise removed, and are observed to be much smoother. Note that, although returned to the time domain, the filtered waveform trains still contain the travel time alignment made via Equation (2). As such, it is necessary to recover the original arrival times for the flexural waveform train at each of the 51 particular depth indices of the common-offset gather $COG_1$, which can be done by applying the corresponding travel time curve (here, $TT_1$) as follows:

$$WAV_{enhanced}(t,z)=WAV'(t+TT(z),z) \quad (9)$$

Figure 10B:
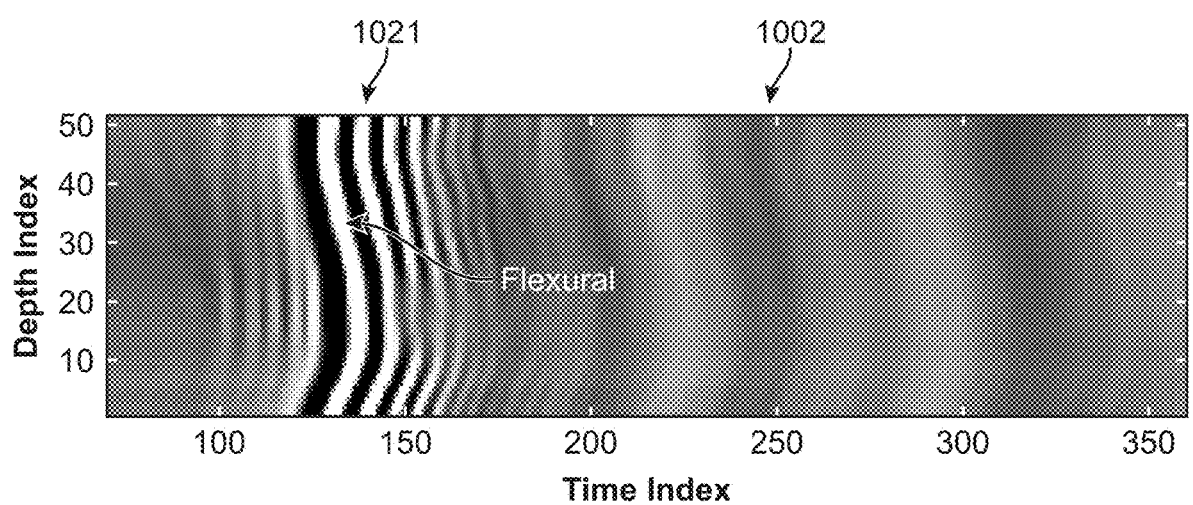
FIG. 10B illustrates the waveform trains of FIG. 10A after original arrival times have been recovered.

FIG. 10B illustrates a VDL display 1002 of enhanced waveform trains for the common-offset gather $COG_1$, i.e. original arrival times for each of the 51 filtered waveform trains have been recovered via the application of Equation (9). The target mode flexural waveform trains 1021 remain strongly expressed, but have been significantly enhanced in comparison to the measured waveform trains of VDL display 701 in FIG. 7A. At this point, the enhancement process for the common-offset gather $COG_1$ of receiver $R_1$ is complete, and the disclosure now turns to an enhanced dispersion analysis.

Enhanced Dispersion Analysis

After all 13 common-offset gathers $COG_1$-$COG_{13}$ have been enhanced in accordance with the above disclosure, an enhanced dispersion analysis may be performed. For example, the dispersion analysis can be performed via differential phase frequency semblance.

Figure 11A:
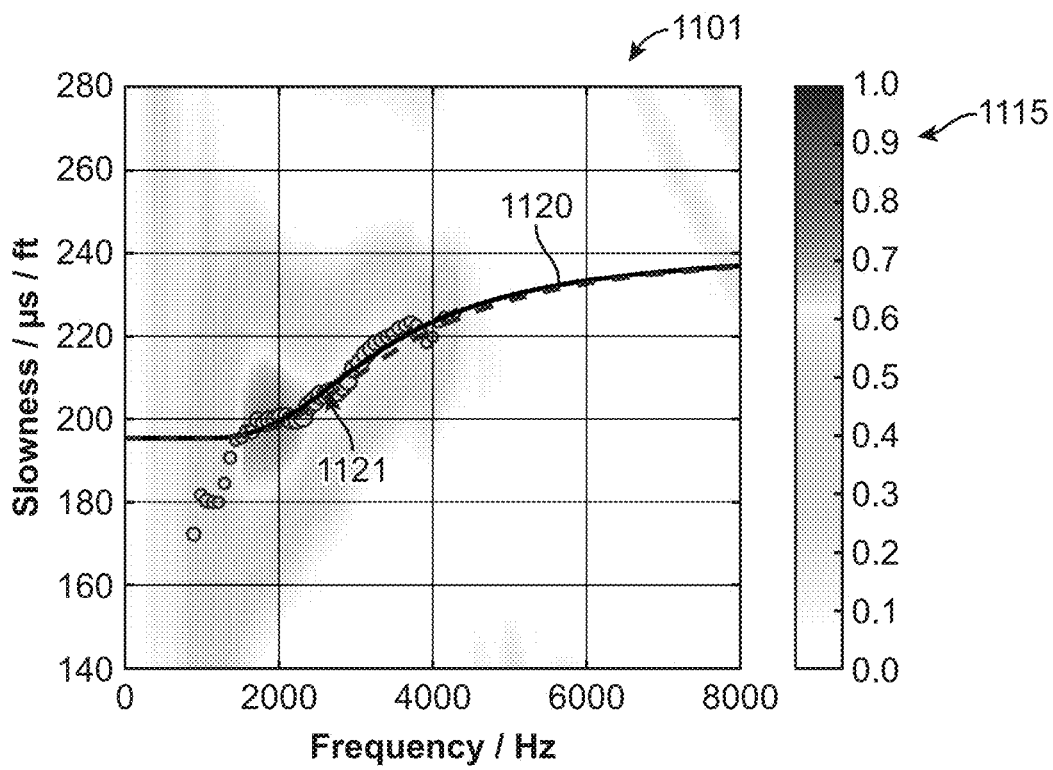
FIG. 11A illustrates dispersion analysis results obtained from un-enhanced waveform trains.
Figure 11B:
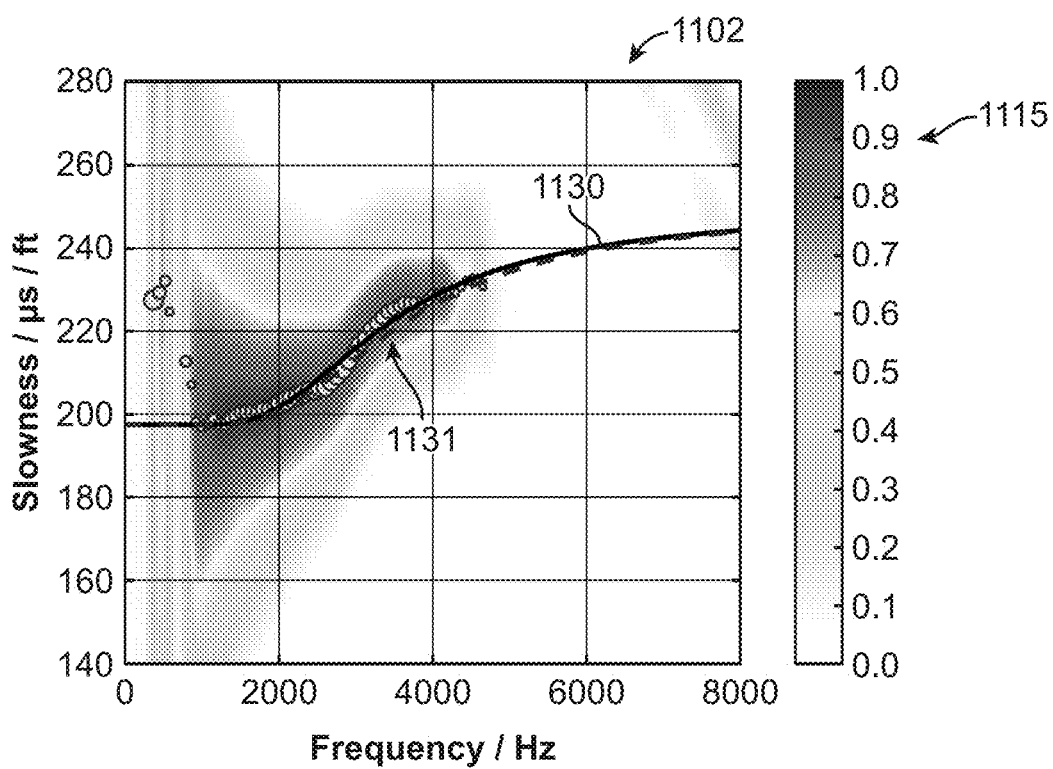
FIG. 11B illustrates dispersion analysis results obtained from enhanced waveform trains.

FIG. 11A depicts the dispersion analysis results 1101 obtained with the un-enhanced waveform trains of common-offset gathers $COG_1$-$COG_{13}$, while FIG. 11B depicts the dispersion analysis results 1102 obtained with the enhanced waveform trains of the present disclosure.

The dispersion analysis results 1101 contain a dispersion curve 1120 that has been fit to the calculated dispersion data 1121. Dispersion curve 1120 and dispersion data 1121 are overlaid with a correlation map 1115, and the correlation is seen to generally be no better than 0.7.

The enhanced dispersion analysis results 1102 contain an enhanced dispersion curve 1130 that has been fit to the enhanced calculated dispersion data 1131. Enhanced dispersion curve 1130 and enhanced dispersion data 1131 are overlaid with the correlation map 1115, and the correlation is seen to consistently reach values of 0.9 and above.

This comparison suggests that the signals after enhancement according to the present disclosure have much better correlation, and an overall enhanced coherence map. More importantly, better and more reliable results are achieved at both the low and high frequencies, where the conventional dispersion analysis results 1101 were demonstrated to be poor.

For example, the enhanced dispersion analysis results 1102 suggest that reliable data can be recovered for frequencies as low as 0.8 kHz. On the other hand, the conventional dispersion analysis results 1101 are only able to recover reliable data down to 1.5 kHz. Additionally, the quality of the attenuation evaluated for target modes has also been improved. This further suggests that entire signals or waveform trains, and their subsequent dispersion analysis results, are greatly enhanced by the method of the present disclosure.

Figure 12:
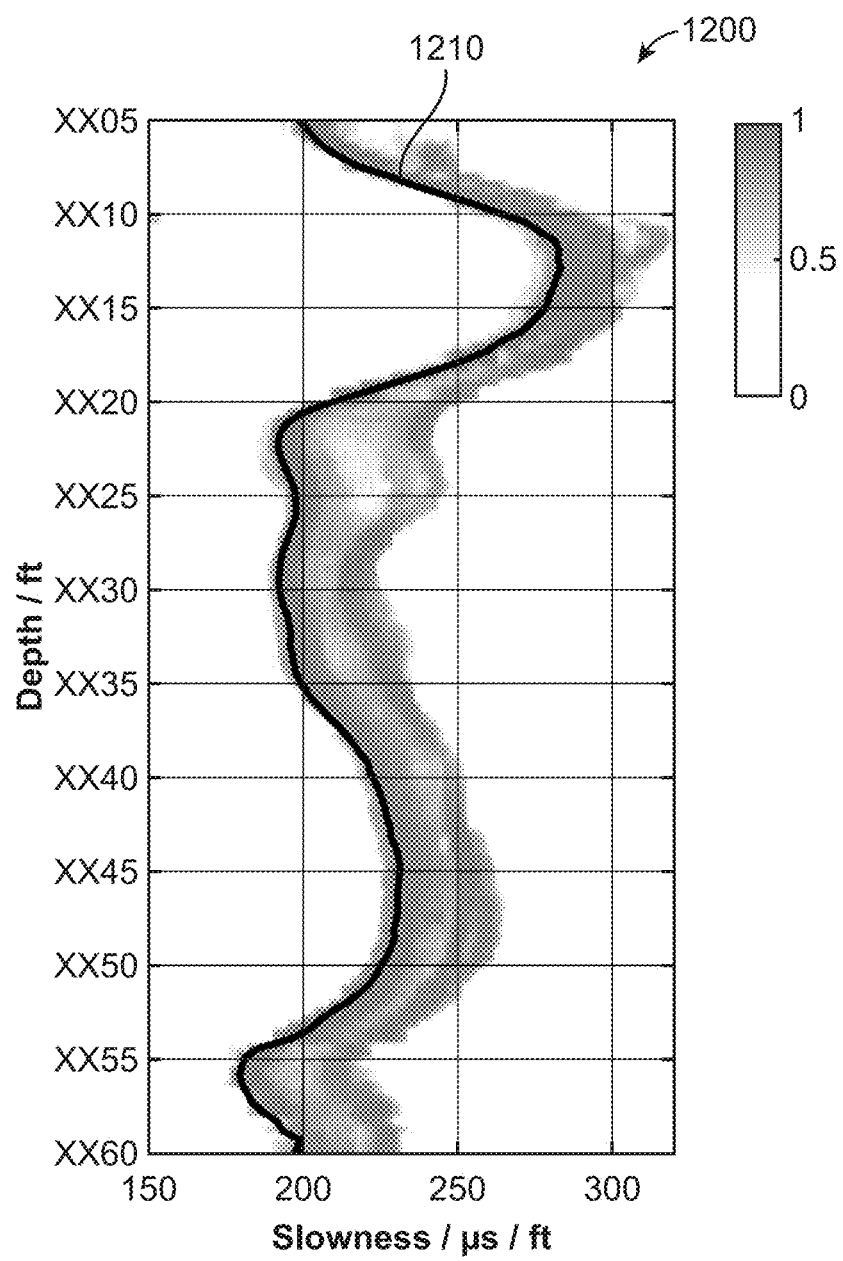
FIG. 12 illustrates a graph of enhanced shear wave slowness.

FIG. 12 depicts a graph 1200 of an enhanced shear slowness curve 1210 produced by enhancing the slowness curve 610 of FIG. 6A in accordance with the method of the present disclosure, where shear slowness of the rock formation has been calculated from dispersion picking results. As was the case in FIG. 6A, the two leading digits of each depth measurement have been obfuscated and replaced with an 'X'. It is additionally noted that FIG. 12 shares the same vertical axis as FIGS. 6A and 6B, e.g. X,X05 indicates the same depth in all three of the figures. Compared to the slowness curve 610, obtained using un-enhanced waveform trains, the enhanced shear slowness curve 1210 is much cleaner, and is continuous and smooth, further suggesting that the dispersion analysis has been improved by the method of the present disclosure. Additionally, it is noted that the missing data in discontinuity 615, at a depth of X,X18 feet, has been recovered entirely on the basis of the enhanced waveform trains of the present disclosure.

The presently discussed dispersion analyses all suggest that the method of the present disclosure greatly improves the quality of dispersion analysis, and provides continuous, stable, and accurate enhanced dispersion curves, which are essential for both basic and advanced answering products of acoustic logging.

Figure 13:
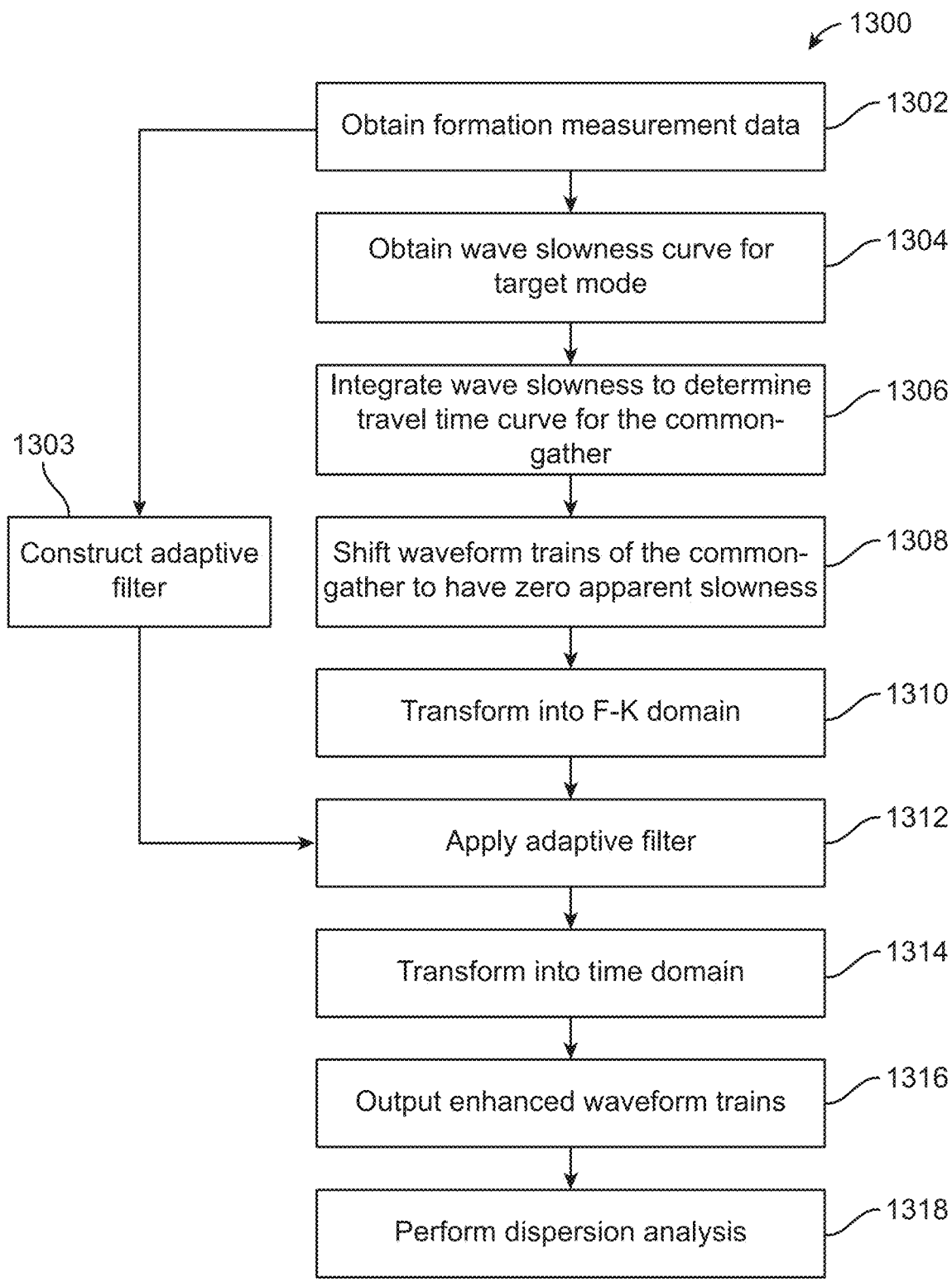
FIG. 13 illustrates a flowchart of a method of the present disclosure.

FIG. 13 presents a flowchart 1300 detailing a method of the present disclosure. The method begins with a step 1302, in which formation measurement data are obtained (i.e. an acoustic logging tool measures waveform trains at various depth indices, as described above). In some embodiments, these data are obtained substantially in advance of the remaining steps 1304-1318. In some embodiments, these data are obtained in substantially real-time with respect to the remaining steps 1304-1318.

The method then proceeds to a step 1304, in which a wave slowness curve is calculated for a target mode. The target mode can be selected in advance, either through additional processing or via a human input. In some embodiments, the target mode is calculated in response to receiving the specific formation data. The same wave slowness curve can be utilized for each receiver of the acoustic logging tool, or multiple wave slowness curves can be calculated for the various receivers of the acoustic logging tool.

The method next proceeds to a step 1306, in which the wave slowness curve is integrated (in accordance with Equation (1)) to generate a travel time curve for a common-gather of waveform trains. In some embodiments, the common-gather can be a common-receiver gather or a common-offset gather. The travel time curves can be individually calculated or collectively calculated all at once. The travel time curves can also be calculated as needed, immediately before proceeding to step 1308, or can be calculated in advance.

In a next step 1308, waveform trains of a common-gather are selected, and target mode waveform trains are shifted to have zero apparent slowness. In other words, the arrival times of target mode waveform trains are aligned. This process can be performed using Equation (2).

In a step 1310, the aligned waveform trains are transformed into the F-K domain via a two-dimensional FFT, as described by Equation (3).

In a subsequent step 1312, an adaptive filter is applied to the transformed waveform trains from step 1310, wherein the adaptive filter passes target modes while suppressing or eliminating non-target modes or noises.

The method consists of a step 1303 for constructing the adaptive filter, which may be performed at any time after step 1302 and prior to step 1312. In some embodiments, the adaptive filter can be constructed as a parallel operation to steps 1304-1310 for generating aligned waveform trains in the F-K domain. In other embodiments, step 1303 may be inserted into the process flow between steps 1302 and 1312. The adaptive filter can be constructed, for example, according to Equations (4), (6), and (7) described above.

A step 1312 then applies the adaptive filter to the aligned waveform trains in the F-K domain, removing non-target modes and noises but passing the target mode. The adaptive filter can be applied according to Equation (5).

Once the adaptive filter has been applied, a step 1314 is performed to transform the filtered waveform trains from step 1312 back into the time domain via an inverse two-dimensional FFT, as described by Equation (8). In some embodiments, one or both of the steps 1310 and 1314 can be combined with the filtering step, such that the 2D FFT and 2D inverse FFT can be applied as a part of the filtering process.

A step 1316 takes as input the filtered time domain waveform trains from step 1312 and outputs enhanced waveform trains. The filtered time domain waveform trains still contain target mode data that has been aligned to have a common arrival time. It is desirable to remove this alignment, by applying the same travel time curve as step 1308. More specifically, the original arrival time of the target mode waveform trains can be recovered via Equation (9), which generates enhanced waveform trains as output, with non-target modes and noises suppresses and target modes enhanced.

In a step 1318, the enhanced waveform trains are received as an input and used to perform enhanced dispersion analysis, as detailed above. The dispersion analysis may be performed in accordance to a variety of methods and techniques, such as DPFS.

Figure 14:
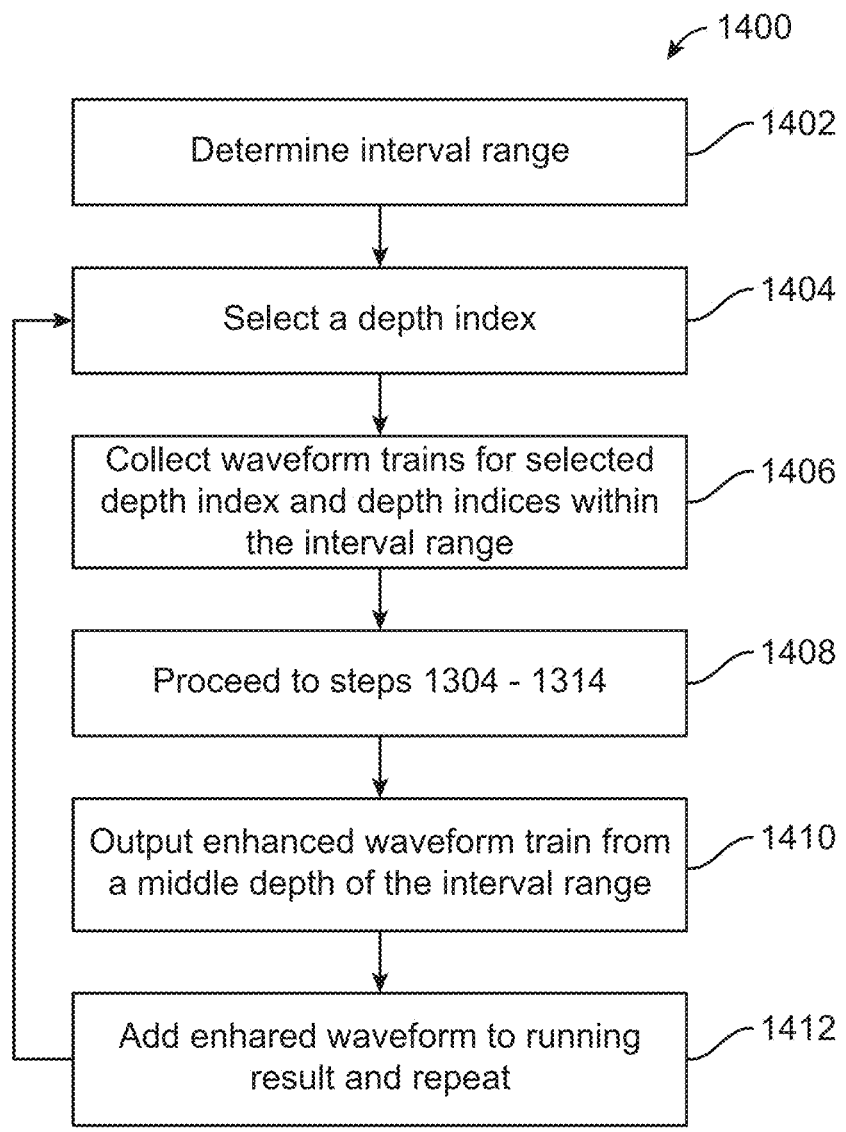
FIG. 14 illustrates a flowchart of a method of the present disclosure.

FIG. 14 presents a flowchart 1400 that can be combined with flowchart 1300 in order to implement an alternate workflow method. Under this method, waveform trains for a given common-gather are processed piecewise, rather than in continuous group or batch. In some embodiments, steps 1402-1406 can be inserted between steps 1302 and 1304 of flowchart 1300, to thereby enable this piecewise processing.

The method begins with a step 1402 in which an interval range is selected. This interval range determines how many additional waveform trains should be used to effectively bracket the waveform train selected for processing. For example, if an interval range of two is applied to depth index 10, then the waveform trains corresponding to depth indices 8-12 would be used in performing the enhancing process for depth index 10.

In a next step 1404, the depth index for processing is selected (i.e. select depth index 10). In some embodiments, steps 1402 and 1404 can be performed concurrently, or in any order desired. In other embodiments, a new interval range can be selected in step 1402 every time it is desired to select a new depth index in step 1404.

In a step 1406, the appropriate waveform trains are collected, corresponding to the selected depth index and interval range. For example, with a depth index of 10 and an interval range of 2, the waveform trains from depth indices 8-12 will be collected and output for processing.

In a step 1408, the method proceeds to step 1304 of flowchart 1300, such that the collected waveform trains from step 1406 comprise the formation data obtained in step 1302. At that point, the collected waveform trains from step 1406 are processed as described previously, in accordance with steps 1304-1314. Step 1314 outputs enhanced filtered time domain waveform trains corresponding to the selected depth index and the bracketing depth indices that form the interval range.

In a step 1410, an output is generated for the selected depth index of step 1404. In some embodiments, this is performed by selecting a waveform train from the middle depths or middle portion of the enhanced filtered time domain waveform trains from step 1408. This waveform train is then outputted as the enhanced waveform train corresponding to the depth index 10.

In a step 1412, the enhanced waveform train for the selected depth index is added to a running or cumulative result, and the method returns to step 1402, where a new depth index is selected. Steps 1402-1412 may be repeated for all depth indices contained in the common-gather of waveform trains, until an enhanced waveform train has been generated for each depth index of the common gather. Once the entire common-gather has been enhanced, the method can proceed to step 1316, where the entirety of the enhanced common-gather is outputted.

In some embodiments, steps 1408 can instead cause the method to proceed to steps 1308-1314, meaning that the wave slowness and travel time curves do not have to be calculated for every piecewise processing of an interval range of the waveform trains. This corresponds to the previously discussed embodiments, in which the travel time curves can be calculated collectively, and in advance.

Embodiments of the present disclosure provide a new and improved method to improve the SNR of selected target modes and to suppress non-target modes and noises. In this manner, both measured waveform trains and any subsequent dispersion analysis are enhanced. Conventional methods may increase the data quality in the source-receiver offset dimension with a simple filter, and consequently improve the data quality of any waveform with good coherence. However, such methods are often inadequate in complex borehole environments. Furthermore, such methods make use of a relatively limited array size and provide no ability to automatically suppress non-target waves. Therefore, they have a limited ability to increase the waveform data quality. The present disclosure provides an acoustic logging tool and a method that operate in in the dimension along the borehole depth axis, rather than the conventional dimension of the transmitter-receiver offset. Along the borehole depth axis, the present disclosure provides for the creation of a proper adaptive filter and a technique to enhance and reconstruct waveforms with this filter. Through the stacking of waveform trains in the depth axis, the SNR is greatly improved and the non-target modes are strongly suppressed. The disclosed method significantly increases the quality of dispersion response and analysis, and provides accurate and stable dispersion curves for both basic and advance borehole acoustic data analysis applications.

Figure 15A:
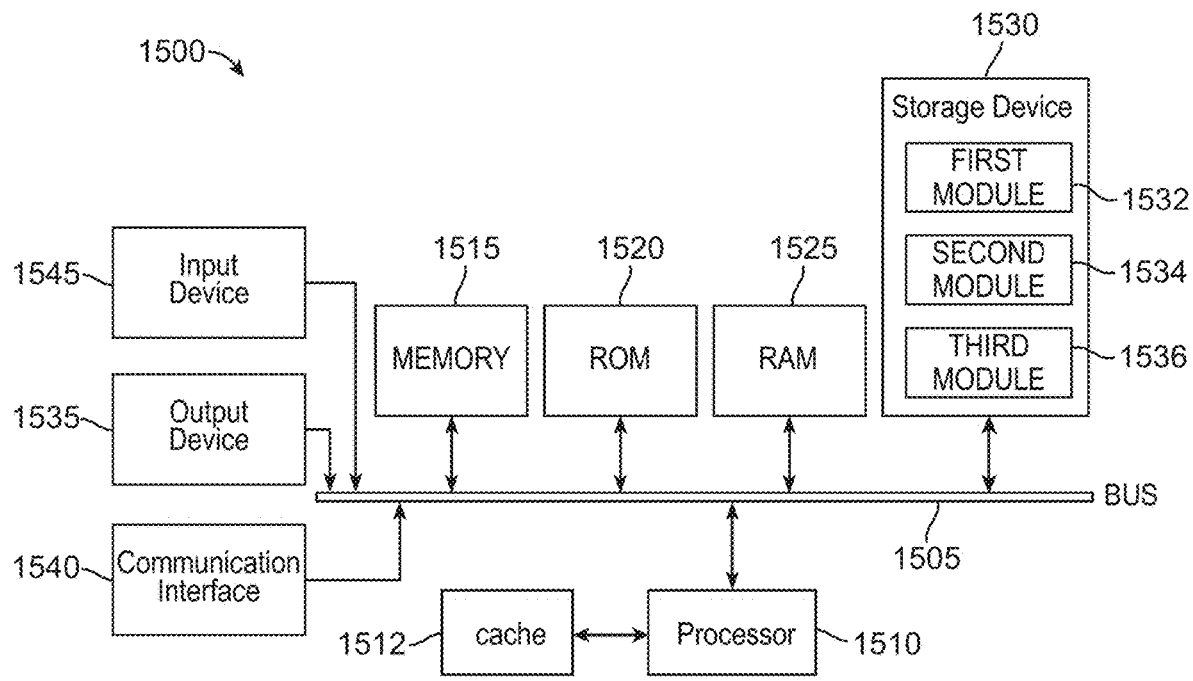
FIG. 15A illustrates a conventional system bus computing system architecture.
Figure 15B:
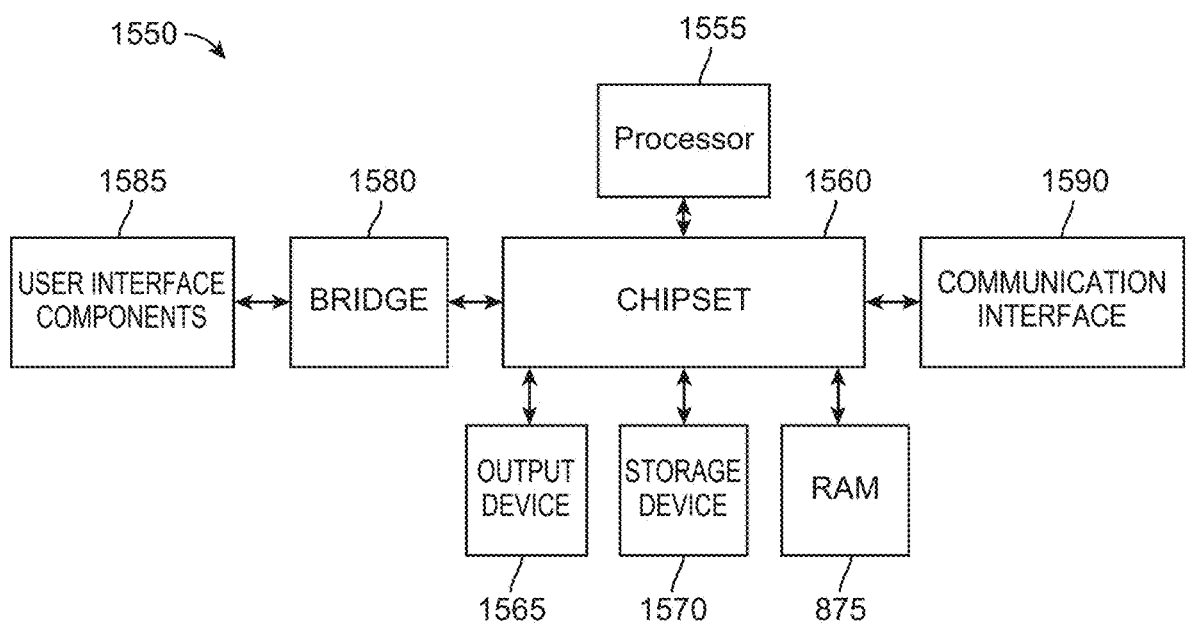
FIG. 15B illustrates an example chipset architecture

FIG. 15A and FIG. 15B illustrate example system embodiments. The more appropriate embodiment will be apparent to those of ordinary skill in the art when practicing the present technology. Persons of ordinary skill in the art will also readily appreciate that other system embodiments are possible.

FIG. 15A illustrates a conventional system bus computing system architecture 1500 wherein the components of the system are in electrical communication with each other using a bus 1505. Exemplary system 1500 includes a processing unit (CPU or processor) 1510 and a system bus 1505 that couples various system components including the system memory 1515, such as read only memory (ROM) 1520 and random access memory (RAM) 1525, to the processor 1510. The system 1500 can include a cache of high-speed memory connected directly with, in close proximity to, or integrated as part of the processor 1510. The system 1500 can copy data from the memory 1515 and/or the storage device 1530 to the cache 1512 for quick access by the processor 1510. In this way, the cache can provide a performance boost that avoids processor 1510 delays while waiting for data. These and other modules can control or be configured to control the processor 1510 to perform various actions. Other system memory 1515 may be available for use as well. The memory 1515 can include multiple different types of memory with different performance characteristics. The processor 1510 can include any general purpose processor and a hardware module or software module, such as module 1 1532, module 2 1534, and module 3 1536 stored in storage device 1530, configured to control the processor 1510 as well as a special-purpose processor where software instructions are incorporated into the actual processor design. The processor 1510 may essentially be a completely self-contained computing system, containing multiple cores or processors, a bus, memory controller, cache, etc. A multi-core processor may be symmetric or asymmetric.

To enable user interaction with the computing device 1500, an input device 1545 can represent any number of input mechanisms, such as a microphone for speech, a touch-sensitive screen for gesture or graphical input, keyboard, mouse, motion input, speech and so forth. An output device 1535 can also be one or more of a number of output mechanisms known to those of skill in the art. In some instances, multimodal systems can enable a user to provide multiple types of input to communicate with the computing device 1500. The communications interface 1540 can generally govern and manage the user input and system output. There is no restriction on operating on any particular hardware arrangement and therefore the basic features here may easily be substituted for improved hardware or firmware arrangements as they are developed.

Storage device 1530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1525, read only memory (ROM) 1520, and hybrids thereof.

The storage device 1530 can include software modules 1532, 1534, 1536 for controlling the processor 1510. Other hardware or software modules are contemplated. The storage device 1530 can be connected to the system bus 1505. In one aspect, a hardware module that performs a particular function can include the software component stored in a computer-readable medium in connection with the necessary hardware components, such as the processor 1510, bus 1505, display 1535, and so forth, to carry out the function.

FIG. 15B illustrates an example computer system 1550 having a chipset architecture that can be used in executing the described method and generating and displaying a graphical user interface (GUI). Computer system 1550 is an example of computer hardware, software, and firmware that can be used to implement the disclosed technology. System 1550 can include a processor 1555, representative of any number of physically and/or logically distinct resources capable of executing software, firmware, and hardware configured to perform identified computations. Processor 1555 can communicate with a chipset 1560 that can control input to and output from processor 1555. In this example, chipset 1560 outputs information to output device 1565, such as a display, and can read and write information to storage device 1570, which can include magnetic media, and solid state media, for example. Chipset 1560 can also read data from and write data to RAM 1575. A bridge 15150 for interfacing with a variety of user interface components 15155 can be provided for interfacing with chipset 1560. Such user interface components 15155 can include a keyboard, a microphone, touch detection and processing circuitry, a pointing device, such as a mouse, and so on. In general, inputs to system 1550 can come from any of a variety of sources, machine generated and/or human generated.

Chipset 1560 can also interface with one or more communication interfaces 1590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1555 analyzing data stored in storage 1570 or 1575. Further, the machine can receive inputs from a user via user interface components 15155 and execute appropriate functions, such as browsing functions by interpreting these inputs using processor 1555.

It can be appreciated that example systems 1500 and 1550 can have more than one processor 1510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

Statements of the Disclosure Include:

Statement 1: A method for enhanced dispersion analysis, the method comprising: obtaining, from two or more receivers of an acoustic logging tool in a borehole, a plurality of measured waveforms; dividing the plurality of measured waveforms into two or more common-gathers of gathered waveforms, and enhancing each common-gather by: calculating a travel time curve for a selected target mode of the gathered waveforms; aligning waveforms of the selected target mode based on the travel time curve to generate aligned waveforms with zero apparent slowness; adaptively filtering the aligned waveforms to suppress non-target mode waves and generate filtered waveforms; and generating enhanced target mode waveforms based on the filtered waveforms and the travel time curve, the enhanced target mode waveforms comprising an enhanced common-gather; and generating an enhanced dispersion curve of the selected target mode from the two or more enhanced common-gathers.

Statement 2: The method of statement 1, wherein the acoustic logging tool is moved through a plurality of depth indices in the borehole, such that each of the two or more receivers measures a waveform at each of a plurality of depth indices.

Statement 3: The method of statement 1, wherein calculating the travel time curve consists of integrating an estimated wave slowness curve of the selected target mode.

Statement 4: The method of statement 1, wherein adaptively filtering the aligned waveforms comprises applying a median filter, a Discrete Radon Transform (DRT), or a frequency-wavenumber (F-K) filter.

Statement 5: The method of statement 4, further comprising applying a coherence-based F-K filter, the coherence-based F-K filter generated by calculating a coherence map between waveforms at different depth indices.

Statement 6: The method of statement 4, wherein the frequency-wavenumber filter is fan-shaped in the frequency-wavenumber domain.

Statement 7: The method of statement 1, further comprising transforming the aligned waveforms into the frequency-wavenumber domain before they are adaptively filtered, and transforming the filtered waveforms into the time domain before generating enhanced target mode waveforms.

Statement 8: The method of statement 1, further comprising applying a differential phase frequency semblance to the enhanced receiver waveform sets to generate the enhanced dispersion curve of the selected target mode.

Statement 9: The method of statement 1, wherein the enhanced target mode waveforms and the enhanced dispersion curve are generated in substantially-real time.

Statement 10: The method of statement 1, wherein the acoustic logging tool is provided via a conveyance or drill string.

Statement 11: The method of statement 1, wherein the common-gather is a common-offset gather.

Statement 12: A system comprising: an acoustic logging tool having a receiver array of two or more receivers, the acoustic logging tool configured to acquire a plurality of measured waveforms; at least one processor in communication with the acoustic logging tool, wherein the processor is coupled with a non-transitory computer-readable storage medium having stored therein instructions which, when executed by the at least one processor, cause the at least one processor to: divide the plurality of measured waveforms into two or more common-gathers of gathered waveforms; calculate a travel time curve for a selected target mode of each of the two or more common gathers; align waveforms of the selected target mode based on the travel time curve to generate aligned waveforms with zero apparent slowness; adaptively filter the aligned waveforms to suppress non-target mode waves and generate filtered waveforms; generate enhanced target mode waveforms based on the filtered waveforms and the travel time curve, the enhanced target mode waveforms divisible into two or more common-gathers of enhanced target mode waveforms; and generate an enhanced dispersion curve of the selected target mode from the two or more enhanced common-gathers.

Statement 13: The system of statement 12, wherein the instructions cause the at least one processor to adaptively filter the aligned waveforms by applying a median filter, a Discrete Radon Transform (DRT) filter, or a frequency-wavenumber (F-K) filter.

Statement 14: The system of statement 13, wherein the non-transitory computer-readable storage medium further contains a set of instructions that when executed by the at least one processor, further cause the at least one processor to: generate a coherence-based F-K filter by calculating a coherence map between waveforms at different depth indices; and apply the coherence-based F-K filter to the aligned waveforms.

Statement 15: The system of statement 12, wherein the non-transitory computer-readable storage medium further contains a set of instructions that when executed by the at least one processor, further cause the at least one processor to: transform the aligned waveforms into the frequency-wavenumber domain before they are adaptively filtered; and transform the filtered waveforms into the time domain before generating enhanced target mode waveforms.

Statement 16: The system of statement 12, wherein the non-transitory computer-readable storage medium further contains a set of instructions that when executed by the at least one processor, further cause the at least one processor to: apply a differential phase frequency semblance to the enhanced receiver waveform sets to generate the enhanced dispersion curve of the selected target mode.

Statement 17: An apparatus comprising: an acoustic logging tool having a receiver array of two or more receivers, the acoustic logging tool configured to acquire a plurality of measured waveforms; at least one processor in communication with the acoustic logging tool, wherein the processor is coupled with a non-transitory computer-readable storage medium having stored therein instructions which, when executed by the at least one processor, cause the at least one processor to: divide the plurality of measured waveforms into two or more common-gathers of gathered waveforms; calculate a travel time curve for a selected target mode of each of the two or more common gathers; align waveforms of the selected target mode based on the travel time curve to generate aligned waveforms with zero apparent slowness; adaptively filter the aligned waveforms to suppress non-target mode waves and generate filtered waveforms; and generate enhanced target mode waveforms based on the filtered waveforms and the travel time curve, the enhanced target mode waveforms divisible into two or more common-gathers of enhanced target mode waveforms.

Statement 18: The apparatus of statement 17, wherein the instructions cause the at least one processor to adaptively filter the aligned waveforms by applying a median filter, a Discrete Radon Transform (DRT) filter, or a frequency-wavenumber (F-K) filter.

Statement 19: The apparatus of statement 17, wherein the non-transitory computer-readable storage medium further contains a set of instructions that when executed by the at least one processor, further cause the at least one processor to: transform the aligned waveforms into the frequency-wavenumber domain before they are adaptively filtered; and transform the filtered waveforms into the time domain before generating enhanced target mode waveforms.

Statement 20: The system of statement 17, wherein the acoustic logging tool is moved through a plurality of depth indices in the borehole, such that each of the two or more receivers measures a waveform at each of a plurality of depth indices.

We claim:

1. A method for enhanced dispersion analysis, the method comprising:
    obtaining, from two or more receivers of an acoustic logging tool in a borehole, noisy data including a plurality of measured waveforms;
    dividing the plurality of measured waveforms into two or more common-gathers of gathered waveforms, and enhancing each common-gather by:
        calculating a travel time curve for a selected target mode of the gathered waveforms;
        aligning waveforms of the selected target mode based on the travel time curve to generate aligned waveforms with zero apparent slowness;
        generating a coherence-based frequency-wavenumber (F-K) filter by calculating a coherence map between waveforms at different depth indices;
        adaptively filtering the aligned waveforms to suppress non-target mode waves and generate filtered waveforms, wherein adaptively filtering the aligned waveforms includes applying the coherence-based F-K filter; and
        generating enhanced target mode waveforms based on the filtered waveforms and the travel time curve, the enhanced target mode waveforms comprising an enhanced common-gather; and
    generating an enhanced dispersion curve of the selected target mode from the two or more enhanced common-gathers, wherein the enhanced dispersion curve includes enhanced signal-to-noise ratios for the selected target mode of the gathered waveforms and suppression of non-target modes relative to the noisy data.

2. The method of claim 1, wherein the acoustic logging tool is moved through a plurality of depth indices in the borehole, such that each of the two or more receivers measures a waveform at each of a plurality of depth indices.

3. The method of claim 1, wherein calculating the travel time curve consists of integrating an estimated wave slowness curve of the selected target mode.

4. The method of claim 1, wherein adaptively filtering the aligned waveforms comprises applying a median filter, a Discrete Radon Transform (DRT) filter, or a frequency-wavenumber (F-K) filter.

5. The method of claim 4, wherein the frequency-wavenumber filter is fan-shaped in a frequency-wavenumber domain.

6. The method of claim 1, further comprising transforming the aligned waveforms into a frequency-wavenumber domain before they are adaptively filtered, and transforming the filtered waveforms into a time domain before generating enhanced target mode waveforms.

7. The method of claim 1, further comprising applying a differential phase frequency semblance to the enhanced target mode waveforms to generate the enhanced dispersion curve of the selected target mode.

8. The method of claim 1, wherein the enhanced target mode waveforms and the enhanced dispersion curve are generated in substantially real-time.

9. The method of claim 1, wherein the acoustic logging tool is provided via a conveyance or drill string.

10. The method of claim 1, wherein the common-gather is a common-offset gather.

11. A system comprising:
    an acoustic logging tool having a receiver array of two or more receivers, the acoustic logging tool configured to acquire noisy data including a plurality of measured waveforms;
    at least one processor in communication with the acoustic logging tool, wherein the processor is coupled with a non-transitory computer-readable storage medium having stored therein instructions which, when executed by the at least one processor, cause the at least one processor to:
        divide the plurality of measured waveforms into two or more common-gathers of gathered waveforms;
        calculate a travel time curve for a selected target mode of each of the two or more common gathers;
        align waveforms of the selected target mode based on the travel time curve to generate aligned waveforms with zero apparent slowness;
        generate a coherence-based frequency-wavenumber (F-K) filter by calculating a coherence map between waveforms at different depth indices;
        adaptively filter the aligned waveforms to suppress non-target mode waves and generate filtered waveforms, wherein adaptively filtering the aligned waveforms includes applying the coherence-based F-K filter;
        generate enhanced target mode waveforms based on the filtered waveforms and the travel time curve, the enhanced target mode waveforms divisible into two or more common-gathers of enhanced target mode waveforms; and
        generate an enhanced dispersion curve of the selected target mode from the two or more enhanced common-gathers, wherein the enhanced dispersion curve includes enhanced signal-to-noise ratios for the selected target mode of the gathered waveforms and suppression of non-target modes relative to the noisy data.

12. The system of claim 11, wherein the instructions cause the at least one processor to adaptively filter the aligned waveforms by applying a median filter, a Discrete Radon Transform (DRT) filter, or a frequency-wavenumber (F-K) filter.

13. The system of claim 11, wherein the non-transitory computer-readable storage medium further contains a set of instructions that when executed by the at least one processor, further cause the at least one processor to:
    transform the aligned waveforms into a frequency-wavenumber domain before they are adaptively filtered; and
    transform the filtered waveforms into the time domain before generating enhanced target mode waveforms.

14. The system of claim 11, wherein the non-transitory computer-readable storage medium further contains a set of instructions that when executed by the at least one processor, further cause the at least one processor to:
    apply a differential phase frequency semblance to the enhanced target mode waveforms to generate the enhanced dispersion curve of the selected target mode.

15. An apparatus comprising:
an acoustic logging tool having a receiver array of two or more receivers, the acoustic logging tool configured to acquire noisy data including a plurality of measured waveforms;
at least one processor in communication with the acoustic logging tool, wherein the processor is coupled with a non-transitory computer-readable storage medium having stored therein instructions which, when executed by the at least one processor, cause the at least one processor to:
divide the plurality of measured waveforms into two or more common-gathers of gathered waveforms;
calculate a travel time curve for a selected target mode of each of the two or more common gathers;
align waveforms of the selected target mode based on the travel time curve to generate aligned waveforms with zero apparent slowness;
generate a coherence-based frequency-wavenumber (F-K) filter by calculating a coherence map between waveforms at different depth indices;
adaptively filter the aligned waveforms to suppress non-target mode waves and generate filtered waveforms, wherein adaptively filtering the aligned waveforms includes applying the coherence-based F-K filter; and
generate enhanced target mode waveforms based on the filtered waveforms and the travel time curve, the enhanced target mode waveforms divisible into two or more common-gathers of enhanced target mode waveforms, wherein the enhanced dispersion curve includes enhanced signal-to-noise ratios for the selected target mode of the gathered waveforms and suppression of non-target modes relative to the noisy data.

16. The apparatus of claim 15, wherein the instructions cause the at least one processor to adaptively filter the aligned waveforms by applying a median filter, a Discrete Radon Transform (DRT) filter, or a frequency-wavenumber (F-K) filter.

17. The apparatus of claim 15, wherein the non-transitory computer-readable storage medium further contains a set of instructions that when executed by the at least one processor, further cause the at least one processor to:
transform the aligned waveforms into a frequency-wavenumber domain before they are adaptively filtered; and
transform the filtered waveforms into the time domain before generating enhanced target mode waveforms.

18. The apparatus of claim 15, wherein the acoustic logging tool is moved through a plurality of depth indices in a borehole, such that each of the two or more receivers measures a waveform at each of a plurality of depth indices.

* * * * *